United States Patent
Takano

(10) Patent No.: US 10,694,391 B2
(45) Date of Patent: Jun. 23, 2020

(54) DEVICE AND METHOD FOR CONTROLLING USE OF A FREQUENCY BAND SHARED BY A CELLULAR SYSTEM AND WIRELESS SYSTEM AMONG MULTIPLE BASE STATIONS

(71) Applicant: SONY CORPORATION, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 1 day.

(21) Appl. No.: 15/327,479

(22) PCT Filed: Jun. 22, 2015

(86) PCT No.: PCT/JP2015/067912
§ 371 (c)(1),
(2) Date: Jan. 19, 2017

(87) PCT Pub. No.: WO2016/031366
PCT Pub. Date: Mar. 3, 2016

(65) Prior Publication Data
US 2017/0201888 A1    Jul. 13, 2017

(30) Foreign Application Priority Data

Aug. 29, 2014   (JP) ................................ 2014-174904

(51) Int. Cl.
*H04W 16/14* (2009.01)
*H04W 72/04* (2009.01)
(Continued)

(52) U.S. Cl.
CPC ........... *H04W 16/14* (2013.01); *H04W 72/04* (2013.01); *H04W 74/0816* (2013.01);
(Continued)

(58) Field of Classification Search
CPC ..... H04W 16/14; H04W 72/02; H04W 72/04; H04W 72/04; H04W 76/02;
(Continued)

(56) References Cited

U.S. PATENT DOCUMENTS

2011/0244806 A1 * 10/2011 Gomes ................. H04W 24/10
                                                            455/67.11
2012/0026941 A1    2/2012 Ahmad et al.
(Continued)

FOREIGN PATENT DOCUMENTS

EP         2 732 582 A1      5/2014
EP         2732582 B1 * 12/2016 ............ H04W 16/14
(Continued)

OTHER PUBLICATIONS

International Search Report dated Aug. 18, 2015 in PCT/JP2015/067912 filed Jun. 22, 2015.
(Continued)

*Primary Examiner* — Candal Elpenord
(74) *Attorney, Agent, or Firm* — Xsensus LLP

(57) ABSTRACT

A device includes a carrier sense unit configured to perform carrier sense for predetermined radio resources among radio resources of a frequency band shared by a cellular system and a wireless local area network (LAN) and a first control unit configured to control wireless communication of a base station of the cellular system in the frequency band in a manner that no signal is transmitted through the predetermined radio resources among the radio resources of the frequency band, and a signal is transmitted through radio resources other than the predetermined radio resources.

20 Claims, 23 Drawing Sheets

(51) Int. Cl.
*H04W 74/08* (2009.01)
*H04W 84/04* (2009.01)
*H04W 84/12* (2009.01)
*H04W 88/06* (2009.01)

(52) U.S. Cl.
CPC .......... *H04W 84/042* (2013.01); *H04W 84/12* (2013.01); *H04W 88/06* (2013.01)

(58) Field of Classification Search
CPC . H04W 76/023; H04W 84/12; H04W 84/042; H04W 88/06
See application file for complete search history.

(56) References Cited

U.S. PATENT DOCUMENTS

| | | | |
|---|---|---|---|
| 2013/0258989 A1* | 10/2013 | Ribeiro | H04W 16/14 370/329 |
| 2014/0036853 A1 | 2/2014 | Kim et al. | |
| 2014/0328306 A1* | 11/2014 | Gao | H04W 16/14 370/329 |
| 2014/0378157 A1 | 12/2014 | Wei et al. | |
| 2015/0092758 A1* | 4/2015 | Chen | H04W 16/14 370/336 |
| 2015/0110012 A1* | 4/2015 | Bhushan | H04W 74/08 370/329 |
| 2015/0163680 A1* | 6/2015 | Valliappan | H04W 16/14 370/329 |
| 2015/0181453 A1* | 6/2015 | Chen | H04L 1/0026 370/252 |
| 2015/0319784 A1* | 11/2015 | Bhushan | H04W 74/08 370/329 |
| 2017/0215083 A1* | 7/2017 | Kudo | H04W 16/14 |

FOREIGN PATENT DOCUMENTS

| | | |
|---|---|---|
| JP | 2000-165927 A | 6/2000 |
| JP | 2006-94001 A | 4/2006 |
| JP | 2009-194855 A | 8/2009 |
| JP | 2013-520938 A | 6/2013 |
| WO | WO 2012/040520 A1 | 3/2012 |
| WO | 2013/006988 A1 | 1/2013 |

OTHER PUBLICATIONS

"Considerations on LBT Enhancements for Licensed-Assisted Access," 3GPP TSG RAN WG1 Meeting #78bis, R1-144083, Aug. 6-10, 2014 (6 pages).
Extended European Search Report dated Mar. 2, 2018 in Patent Application No. 15836977.7, 8 pages.

\* cited by examiner

DEVICE AND METHOD FOR CONTROLLING USE OF A FREQUENCY BAND SHARED BY A CELLULAR SYSTEM AND WIRELESS SYSTEM AMONG MULTIPLE BASE STATIONS

TECHNICAL FIELD

The present disclosure relates to a device and a method.

BACKGROUND ART

In the 3$^{rd}$ Generation Partnership Project (3GPP), various technologies for improving system throughput have been discussed. It may be said that a first shortcut for improving the system throughput is increasing a frequency to be used. In the 3GPP, the technology of carrier aggregation (CA) has been considered in Release 10 and Release 11. CA is a technology for improving the system throughput and a maximum data rate by aggregating component carriers (CCs) having a bandwidth of 20 MHz for use. A frequency band available as a CC must adopt the technology of such CA. Thus, a frequency band available for wireless communication of a cellular system is required.

For example, in Patent Literature 1, technology which enables a registered frequency band available for a registered provider and an unlicensed band available when a predetermined condition is satisfied to be used in addition to a dedicated frequency band allocated to each provider for exclusive use is disclosed.

CITATION LIST

Patent Literature

Patent Literature 1: JP2006-094001A

DISCLOSURE OF INVENTION

Technical Problem

For example, a frequency band (for example, a channel of a wireless LAN included in a band of 5 GHz) is shared between the cellular system and the wireless local area network (LAN). In this case, for example, a node (for example, a base station) of the cellular system also performs carrier sense for the frequency band and uses the frequency band.

However, in this case, in the carrier sense, the node of the cellular system may detect not only a signal transmitted from a node (for example, an access point or a station) of the wireless LAN but also signals transmitted from other nodes of the cellular system. As a result, when competition between the nodes of the cellular system occurs, the use of the frequency band in the cellular system may be limited.

In this regard, it is desirable to provide a mechanism capable of using the frequency band shared by the cellular system and the wireless LAN in the cellular system more flexibly.

Solution to Problem

According to the present disclosure, there is provided a device including a carrier sense unit configured to perform carrier sense for predetermined radio resources among radio resources of a frequency band shared by a cellular system and a wireless local area network (LAN) and a first control unit configured to control wireless communication of a base station of the cellular system in the frequency band in a manner that no signal is transmitted through the predetermined radio resources among the radio resources of the frequency band, and a signal is transmitted through radio resources other than the predetermined radio resources.

Further, according to the present disclosure, there is provided a method including performing, by a processor, carrier sense for predetermined radio resources among radio resources of a frequency band shared by a cellular system and a wireless local area network (LAN) and controlling, by the processor, wireless communication of a base station of the cellular system in the frequency band in a manner that no signal is transmitted through the predetermined radio resources among the radio resources of the frequency band, and a signal is transmitted through radio resources other than the predetermined radio resources.

Advantageous Effects of Invention

As described above, according to the present disclosure, it is possible to use the frequency band shared by the cellular system and the wireless LAN in the cellular system more flexibly. Note that the effects described above are not necessarily limited, and along with or instead of the effects, any effect that is desired to be introduced in the present specification or other effects that can be expected from the present specification may be exhibited.

MODE(S) FOR CARRYING OUT THE INVENTION

Figure 1:
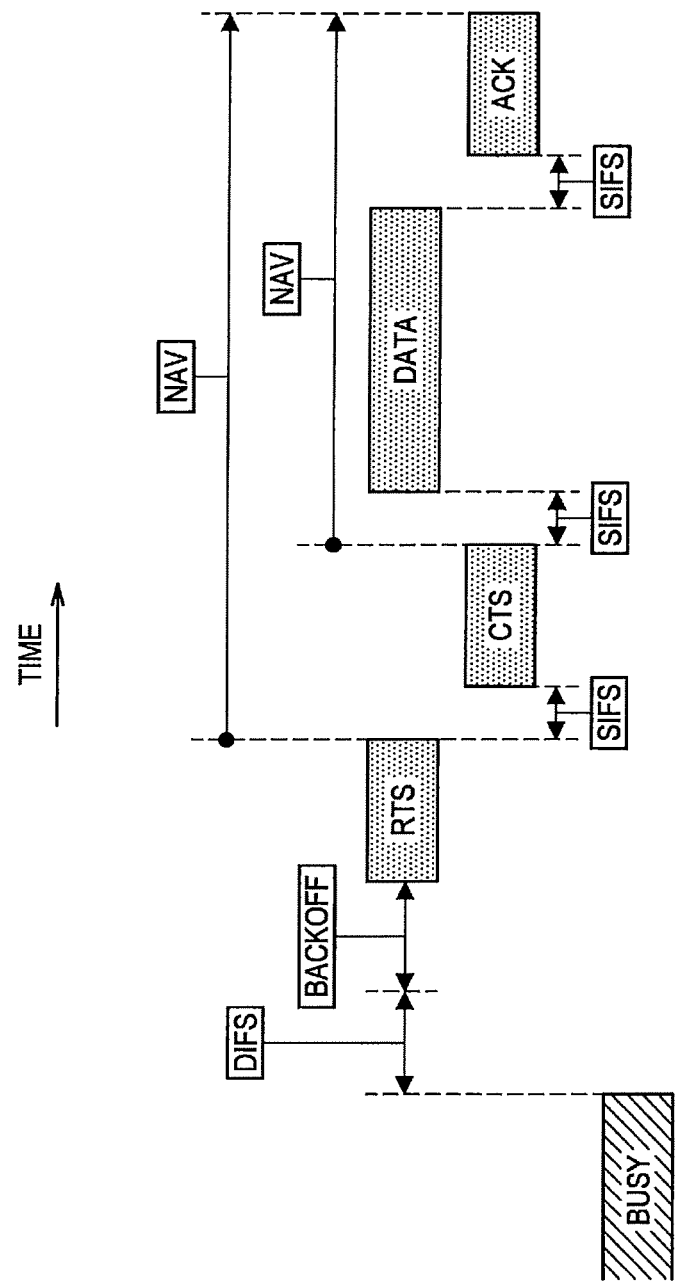
FIG. 1 is an explanatory diagram illustrating a frame format of Institute of Electrical and Electronics Engineers (IEEE) 802.11.

Hereinafter, preferred embodiments of the present disclosure will be described in detail and with reference to the attached drawings. Note that, in this specification and the appended drawings, structural elements that have substantially the same function and structure are denoted with the same reference numerals, and repeated explanation of these structural elements is omitted.

Note that, in this specification and the appended drawings, different letters may be added to the end of structural elements having substantially the same function to distinguish them. For example, a plurality of structural elements having substantially the same functional configuration are distinguished as necessary, as in base stations 100A, 100B, and 100C. However, when it is unnecessary to distinguish such a plurality of structural elements having substantially the same functional configuration, only the same reference numeral is given. For example, when the base stations 100A, 100B, and 100C need not be particularly distinguished, they are referred to simply as a "base station 100."

The description will proceed in the following order.
1. Introduction
2. First embodiment
2.1. Overview
2.2. Schematic configuration of communication system
2.3. Configuration of base station
2.4. Technical characteristics of first embodiment
2.5. Flow of process
3. Second embodiment
3.1. Overview
3.2. Schematic configuration of communication system
3.3. Configuration of base station
3.4. Technical characteristics of second embodiment
3.5. Flow of process
4. Third embodiment
4.1. Overview
4.2. Schematic configuration of communication system
4.3. Configuration of base station
4.4. Configuration of base station
4.5. Technical characteristics of third embodiment
4.6. Flow of process
5. Application example
6. Conclusion

1. Introduction

Figure 2:
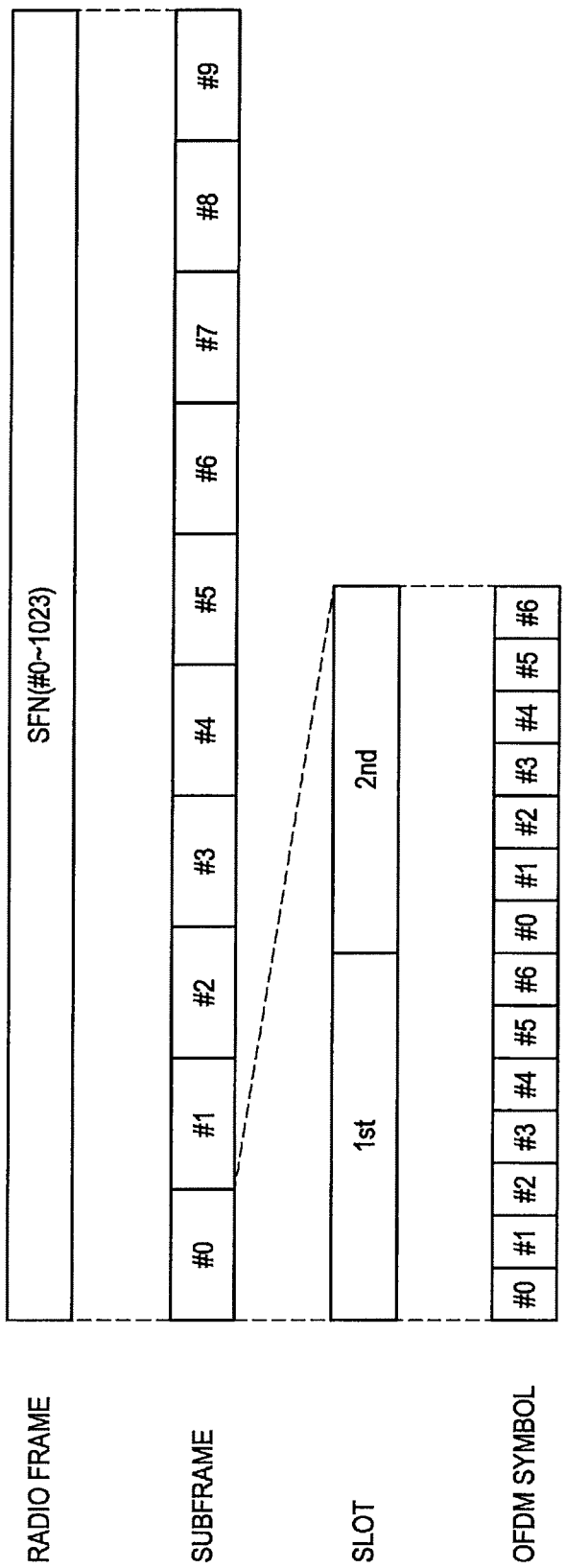
FIG. 2 is an explanatory diagram illustrating a frame format of long-term evolution (LTE).

First, sharing of a frequency band, technology related to wireless communication, and technology related to a cellular system will be described with reference to FIGS. 1 and 2.
(Sharing of Frequency Band)
(a) Background of Frequency Sharing A frequency band available for the cellular system is required. For example, a band of 5 GHz is considered as a frequency band for use in the cellular system.

However, the band of 5 GHz is also used in the wireless LAN. Thus, when the cellular system uses the band of 5 GHz, for example, the band of 5 GHz is shared between cellular system and wireless LAN. Specifically, for example, a frequency band of 5 GHz (for example, a channel of a wireless LAN) is used in the wireless LAN communication at a certain time and used in the cellular system at another time. Thereby, frequency utilization efficiency of the band of 5 GHz is improved. Also, the wireless LAN standard includes Institute of Electrical and Electronics Engineers (IEEE) 802.11a, 11b, 11g, 11n, 11ac, and 11ad, etc. and these standards are characterized in that IEEE 802.11 is adopted for a media access control (MAC) layer.
(b) Sharing Technique Wireless LAN nodes (an access point and a station) are already widespread around the world. For this reason, from the point of view of backward compatibility, it is desirable for a mechanism for sharing a frequency band between a cellular system and a wireless LAN that does not change operations of the wireless LAN nodes to be reviewed as a technique of Long Term Evolution (LIE) and decided as a new standard of LTE. A terminal device conforming to the new standard is considered to use a frequency band shared between the cellular system and the wireless LAN (hereinafter referred to as a "shared band"), while a terminal device not conforming to the new standard is considered not to use the shared band.
(c) Usage as Component Carrier In LTE, LTE-Advanced, or a cellular system conforming to a communication standard equivalent thereto, the shared band will be used as, for example, a component carrier (CC). Further, it is assumed that the frequency band of the cellular system is used as a primary component carrier (PCC) and the shared band is used as a secondary component carrier (SCC). Also, a control signal and a data signal can be transmitted and received using a frequency band of the cellular system and the data signal can be transmitted and received using the shared band.
(d) Fair Sharing It is desirable for the shared band to be fairly shared between the cellular system and the wireless LAN. In the wireless LAN, since a channel (the shared band) is fairly shared according to carrier sense multiple access (CSMA), it is desirable for the channel (the shared band) to be fairly shared, for example, even between the cellular system and the wireless LAN through a technique in which CSMA is considered.

Various sharing techniques can be considered as fair sharing. For example, fair sharing can be defined as "the case in which opportunities for the wireless LAN to use the shared band and opportunities for the cellular system to use the shared band are equally given." In other words, it does not means that the cellular system and the wireless LAN are the same in actual communication traffic, and any case in which the same opportunities of communication are given to the cellular system and the wireless LAN is regarded as fair sharing.

As an example, when the shared band is used in the cellular system for a certain period, then the shared band is not used in the cellular system for the same period.

(Technology Related to Wireless LAN)

A frame format of IEEE 802.11 will be described as the technology related to wireless LAN with reference to FIG. 1. FIG. 1 is an explanatory diagram illustrating a frame format of IEEE 802.11.

In IEEE 802.11, a DATA frame and an acknowledgement (ACK) frame are basic frames. When the DATA frame is correctly received, the ACK frame is a frame which causes a transmitting side to know the success of reception of the DATA frame. Although wireless communication can be performed only by the DATA frame and the ACK frame in the wireless LAN, two frames such as a request to send (RTS) frame and a clear to send (CTS) frame are generally further used.

Before the RTS frame is transmitted, each wireless LAN node which performs the wireless LAN communication confirms that no signal is transmitted during a period referred to as a distributed coordination function (DCF) inter-frame space (DIFS). This is referred to as carrier sense. When nodes simultaneously start to transmit signals at a point in time at which the DIFS has elapsed, the signals may collide with each other. Thus, each node waits for a backoff time randomly set for each node and transmits a signal if no signal is transmitted for the backoff time.

Basically, the node cannot transmit the signal while any signal is detected. However, because there is a hidden terminal problem, an RTS frame and a CTS frame including a duration field for setting a value referred to as a network allocation vector (NAV) are added. The NAV is set on the basis of a value included in the duration field. The node setting the NAV avoids transmitting a signal during a period of the NAV.

First, a first node for transmitting the DATA frame transmits the RTS frame. Then, another node located around the first node receives the RTS frame and acquires a value included in the duration field in the RTS frame. The other node sets, for example, its own NAV to the above-mentioned acquired value and avoids transmitting a signal during the period of the NAV. For example, the period of the NAV is a period from the end of the RTS frame to the end of the ACK frame.

Also, a second node for receiving the DATA frame transmits the CTS frame after only a short inter-frame space (SIFS) from the end of the RTS frame according to the reception of the RTS frame. Then, another node located around the above-mentioned second node receives the CTS frame and acquires a value included in the duration field in the CTS frame. The other node sets, for example, its own NAV to the above-mentioned acquired value and avoids transmitting a signal during the period of the NAV. The period of the NAV is a period from the end of the CTS frame to the end of the ACK frame. Thereby, for example, it is possible to prevent the other node (that is, a hidden node for the above-mentioned first node) close to the above-mentioned second node without being close to the above-mentioned first node from transmitting a signal during communication of the above-mentioned first node and the above-mentioned second node.

Also, the RTS frame includes a frame control field, a reception address field, a transmission address field, and a frame check sequence (FCS) in addition to the duration field. Also, the CTS frame includes a frame control field, a reception address field, and an FCS in addition to the duration field.

Also, the DIFS and the SIFS in the standard of the IEEE 802.11 series have, for example, the following lengths.

TABLE 1

|  | 802.11b | 802.11g | 802.11a | 802.11n | 802.11ac |
| --- | --- | --- | --- | --- | --- |
| SIFS | 10 us | 10 us | 16 us | 16 us | 16 us |
| DIFS | 50 us | 28 us | 34 us | 34 us | 34 us |

(Technology Related to Cellular System)

(a) Frame Format

The frame format of LIE will be described with reference to FIG. 2. FIG. 2 is an explanatory diagram illustrating the frame format of LTE.

First, a unit of time such as a radio frame is used in LIE. One radio frame is 10 ms. Each radio frame is identified by a system frame number (SFN) which is any one of 0 to 1023.

The radio frame includes 10 sub-frames identified by #0 to #9. Each sub-frame is 1 ms. Further, each sub-frame includes two slots and each slot includes, for example, seven orthogonal frequency division multiplexing (OFDM) symbols. That is, each sub-frame includes 14 OFDM symbols. Also, the frame format illustrated in FIG. 2 is a frame format of a downlink and the frame format of an uplink includes a single carrier frequency division multiple access (SC-FDMA) symbol in place of an OFDM symbol.

(b) Carrier Aggregation

Component Carriers

With carrier aggregation in Release 10, up to a maximum of five CCs are aggregated for use by user equipment (UE). Each CC is a band with a maximum width of 20 MHz. Carrier aggregation includes a case in which successive CCs in the frequency direction are used, and a case in which separated CCs in the frequency direction are used. With carrier aggregation, the CCs to be used may be set for each UE.

PCC and SCC

In carrier aggregation, one of the multiple CCs used by a UE is a special CC. This special CC is called the primary component carrier (PCC). Also, the remaining CCs among the multiple CCs are called secondary component carriers (SCCs). The PCC may be different depending on the UE.

Since the PCC is the most important CC among the multiple CCs, it is desirable for the PCC to be the CC with the most stable communication quality. Note that in actual practice, which CC to treat as the PCC depends on the implementation.

The SCC is added to the PCC. In addition, an existing SCC that has been added may also be removed. Note that changing an SCC is conducted by removing an existing SCC and adding a new SCC.

PCC Determination Method and Changing Method

When a UE connection is initially established and the status of the UE goes from Radio Resource Control (RRC) Idle to RRC Connected, the CC that the UE used during the establishment of the connection becomes the PCC for that UE. More specifically, a connection is established through a connection establishment procedure. At this point, the status of the UE goes from RRC Idle to RRC Connected. Also, the CC used in the procedure becomes the PCC for the above UE. Note that the above procedure is a procedure initiated from the UE side.

Additionally, PCC changing is conducted by a handover between frequencies. More specifically, if a handover is specified in a connection reconfiguration procedure, a PCC handover is conducted, and the PCC is changed. Note that the above procedure is a procedure initiated from the network side.

Adding SCC

As discussed above, the SCC is added to the PCC. As a result, the SCC is associated with the PCC. In other words, the SCC is subordinate to the PCC. SSC addition may be conducted through a connection reconfiguration procedure. Note that this procedure is a procedure initiated from the network side.

Removing SSC

As discussed above, an SCC may be removed. SSC removal may be conducted through a connection reconfiguration procedure. Specifically, a specific SCC specified in a message is removed. Note that the above procedure is a procedure initiated from the network side.

In addition, the removal of all SCCs may be conducted through a connection re-establishment procedure.

Special Role of PCC

The connection establishment procedure, the transmitting and receiving of non-access stratum (NAS) signaling, and the transmitting and receiving of uplink control signals on the physical uplink control channel (PUCCH) are conducted only by the PCC, and not by the SCCs.

In addition, the detection of a radio link failure (RLF) and a subsequent connection re-establishment procedure are also conducted only by the PCC, and not by the SCCs.
(Conditions of Backhauling for Carrier Aggregation)

For example, an ACK of a downlink signal on an SCC is transmitted by the PUCCH of the PCC. Since the ACK is used for the retransmission of data by the evolved Node B (eNB), a delay of the ACK is not acceptable. Consequently, when a first eNB using a CC that acts as the PCC for a UE is different from a second eNB using a CC that acts as an SCC for the UE, a backhaul delay of approximately 10 ms between the first eNB and the second eNB is desirable.

2. First Embodiment

Next, a first embodiment will be described with reference to FIGS. 3 to 13.
<2.1. Overview>
(Technical Problem)

For example, a frequency band (for example, a channel of a wireless LAN included in a band of 5 GHz) is shared between the cellular system and the wireless LAN (Local Area Network). In this case, for example, a node (for example, a base station) of the cellular system also performs carrier sense for a frequency band and uses the frequency band.

However, in this case, in the carrier sense, the node of the cellular system may detect not only a signal transmitted from a node (for example, an access point or a station) of the wireless LAN but also signals transmitted from other nodes of the cellular system. As a result, when there is competition between the nodes of the cellular system, the use of the frequency band in the cellular system may be limited. This point will be described below with reference to FIGS. 3 to 5 using a specific example.

Figure 3:
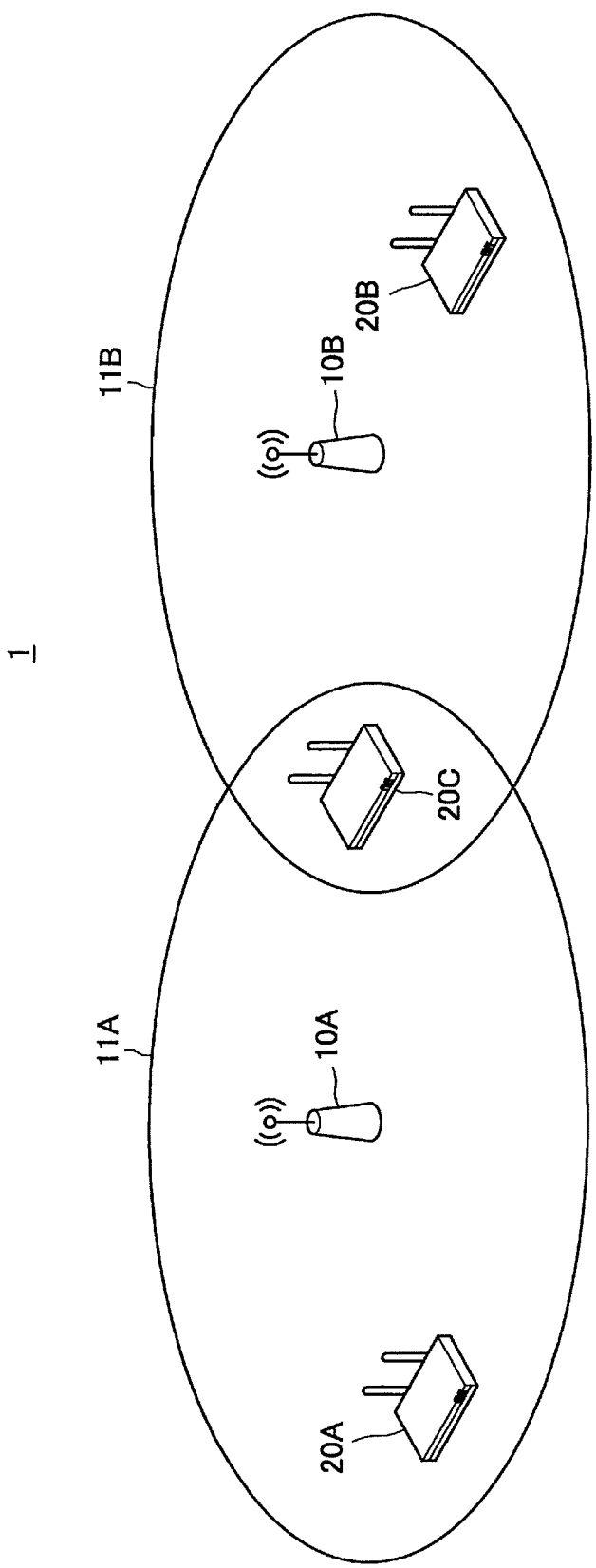
FIG. 3 is a first explanatory diagram for describing an example of competition between nodes of cellular systems.
Figure 4:
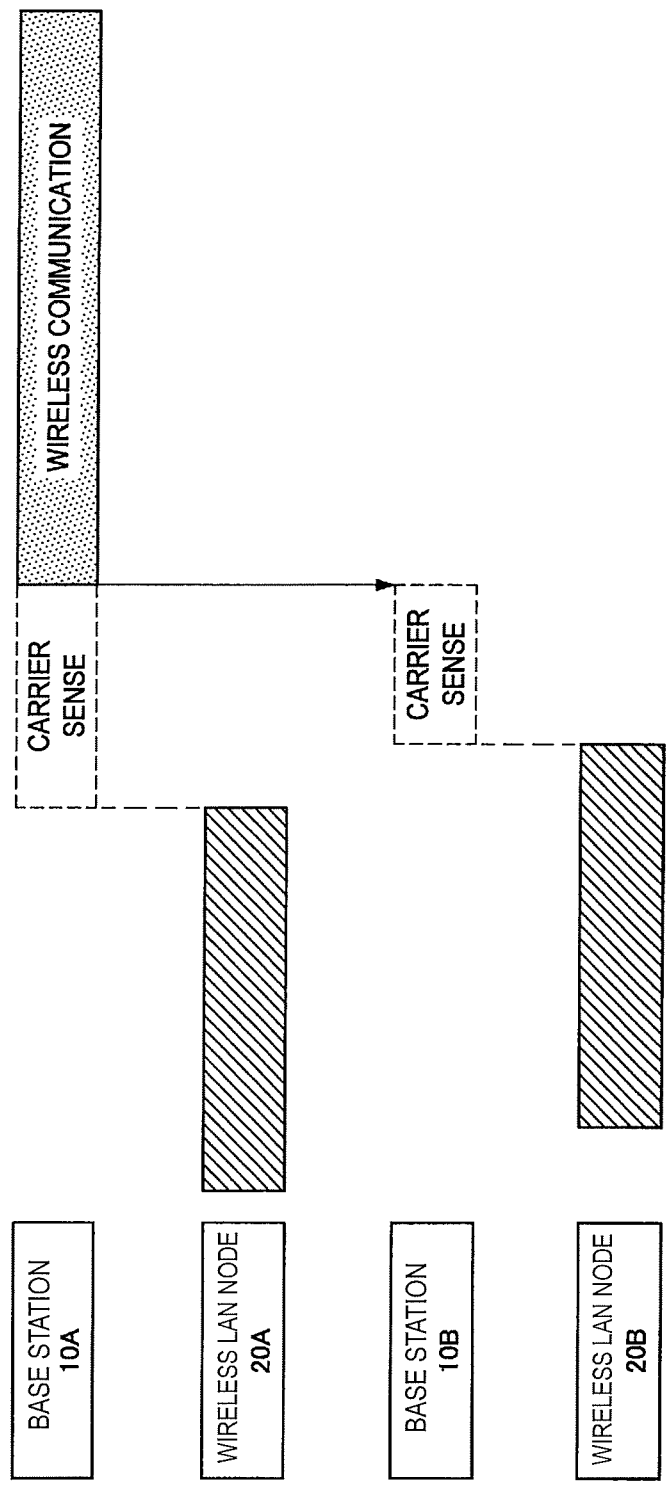
FIG. 4 is a second explanatory diagram for describing an example of competition between nodes of cellular systems.
Figure 5:
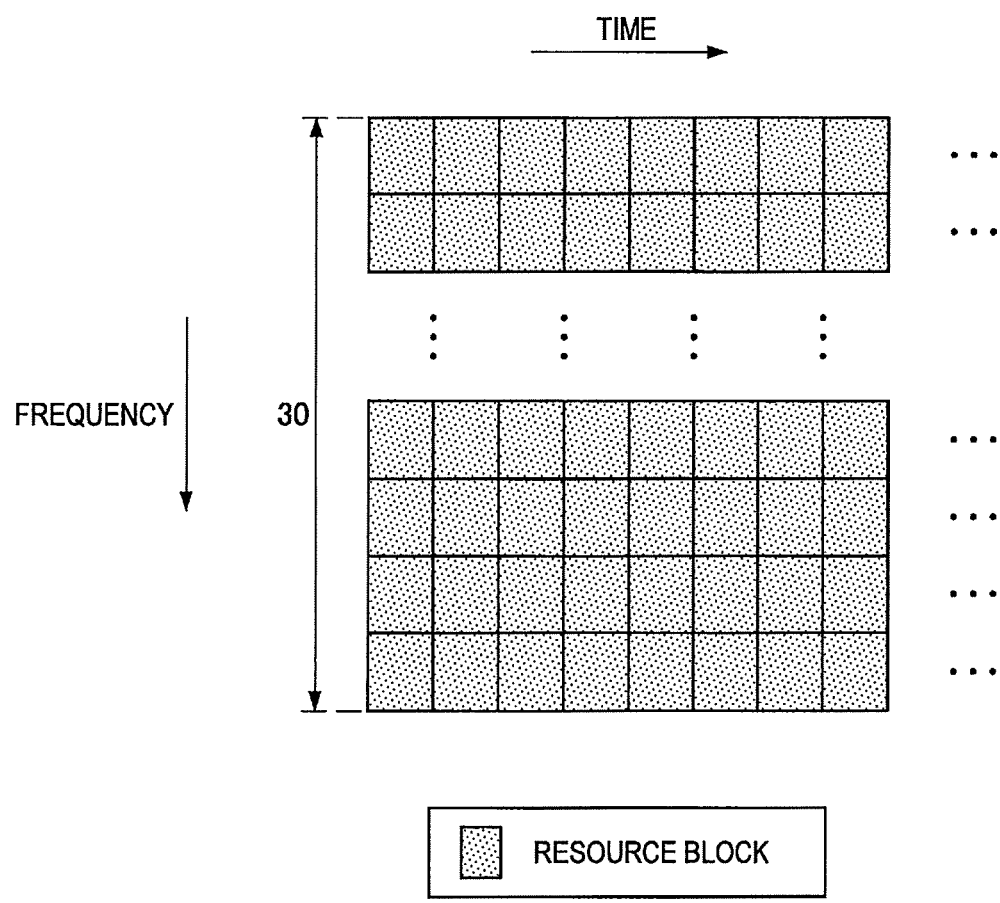
FIG. 5 is a third explanatory diagram for describing an example of competition between nodes of cellular systems.

FIGS. 3 to 5 are explanatory diagrams for describing an example of competition between nodes of a cellular system. Referring to FIG. 3, base stations 10A and 10B and wireless LAN nodes 20A, 20B, and 20C of a cellular system are illustrated. In this example, the base station 10A is able to receive signals transmitted from the wireless LAN nodes 20A and 20C and the base station 10B but does not receive a signal transmitted from the wireless LAN node 20B. The base station 10B is able to receive signals transmitted from the wireless LAN nodes 20B and 20C and the base station 10A but does not receive a signal transmitted from the wireless LAN node 20A.

For example, as illustrated in FIG. 4, when transmission of a signal using the shared band by the wireless LAN node 20A ends, the base station 10A performs the carrier sense for the shared band and performs wireless communication using the shared band. On the other hand, when transmission of a signal using the shared band by the wireless LAN node 20B ends, the base station 10B performs the carrier sense for the shared band. However, the base station 10B detects the signal transmitted from the base station 10A in the carrier sense. As a result, the base station 10B is unable to perform wireless communication using the shared band due to the use of the shared band by the base station 10A.

Further, as illustrated in FIG. 5, the base station 10 and the wireless LAN node 20 transmit signals using the entire shared band 30 (the entire channel of the wireless LAN). In other words, the base station 10 transmits the signal using all resource blocks arranged in a frequency direction in the shared band 30. The base station 10 and the wireless LAN node 20 perform the carrier sense for the entire shared band 30.

As described above, when competition between the nodes of the cellular system occurs, the use of the frequency band (that is, the shared band) in the cellular system may be limited. In this regard, it is desirable to provide a mechanism capable of using the frequency band shared by the cellular system and the wireless LAN (that is, the shared band) in the cellular system more flexibly.
(Solution)

In the first embodiment, the base station performs the carrier sense for predetermined radio resources among radio resources of the frequency band shared by the cellular system and the wireless LAN. Further, wireless communication of the base station in the frequency band is controlled in a manner that a signal is not transmitted through the predetermined radio resources among the radio resources of the frequency band, and the signal is transmitted through radio resources other than the predetermined radio resources.

Accordingly, for example, the frequency band shared by the cellular system and the wireless LAN (that is, the shared band) can be more flexibly used in the cellular system.
<2.2. Schematic Configuration of Communication System>

Figure 6:
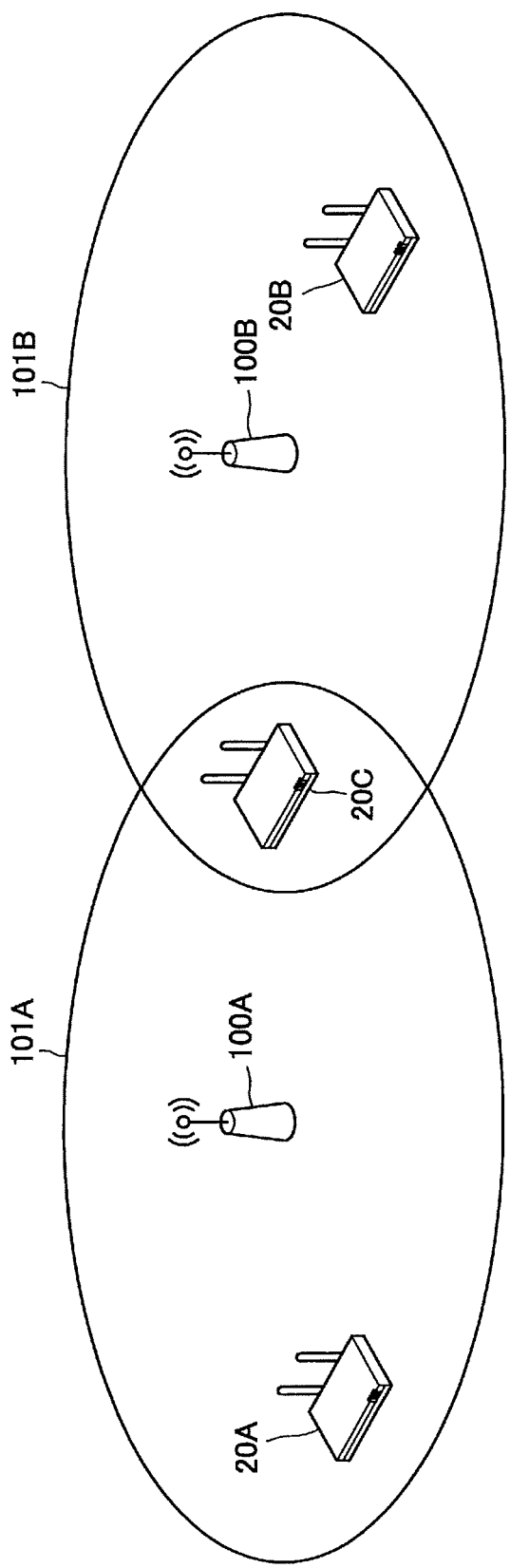
FIG. 6 is an explanatory diagram illustrating an example of a schematic configuration of a communication system according to a first embodiment.

Next, a schematic configuration of a communication system 1 according to the first embodiment will be described with reference to 6. FIG. 6 is an explanatory diagram illustrating an example of a schematic configuration of the communication system 1 according to the first embodiment. Referring to FIG. 6, the communication system 1 includes a base station 100 and a wireless LAN node 20.
(Base Station 100)

The base station 100 is a base station of the cellular system. For example, the cellular system is a system conforming to LTE, LTE-Advanced, and a communication standard equivalent thereto.

(a) Frequency Band

The base station 100 performs wireless communication using a frequency band for the cellular system. For example, the frequency band is a component carrier for the cellular system.

Particularly, in the first embodiment, the base station 100 further performs wireless communication using the frequency band shared by the cellular system and the wireless LAN (that is, the shared band). For example, the shared band is a channel of the wireless LAN. More specifically, for example, the shared band is a channel of a band of 5 GHz (or a band of 2.4 GHz) and a bandwidth of 20 MHz.

The frequency band for the cellular system is a licensed band or a frequency band included in the licensed band. The shared band is an unlicensed band or a frequency band included in the unlicensed band.

(b) Wireless Communication with Terminal Device

The base station 100 performs wireless communication with the terminal device. For example, the base station 100 performs wireless communication with a terminal device located within a cell 101 of the base station 100. Specifically, for example, the base station 100 transmits a downlink signal to the terminal device, and receives an uplink signal from the terminal device.

(Wireless LAN Node 20)

The wireless LAN node 20 is an access point or a station of the wireless LAN. For example, the wireless LAN node 20 operates according to any one of IEEE 802.11 standards (for example, IEEE 802.11a, 11b, 11g, 11n, 11ac, 11ad, and the like).

The wireless LAN node 20 performs wireless communication through the channel of the wireless LAN (that is, the shared band). For example, the wireless LAN node 20 performs wireless communication according to the CSMA. More specifically, for example, the wireless LAN node 20 performs the carrier sense for the channel. Further, when the result of the carrier sense indicates that the channel is usable (for example, when the result of the carrier sense indicates that no signal is transmitted from other nodes through the channel for a predetermined time), the wireless LAN node 20 performs wireless communication through the channel.

<2.3. Configuration of Base Station>

Figure 7:
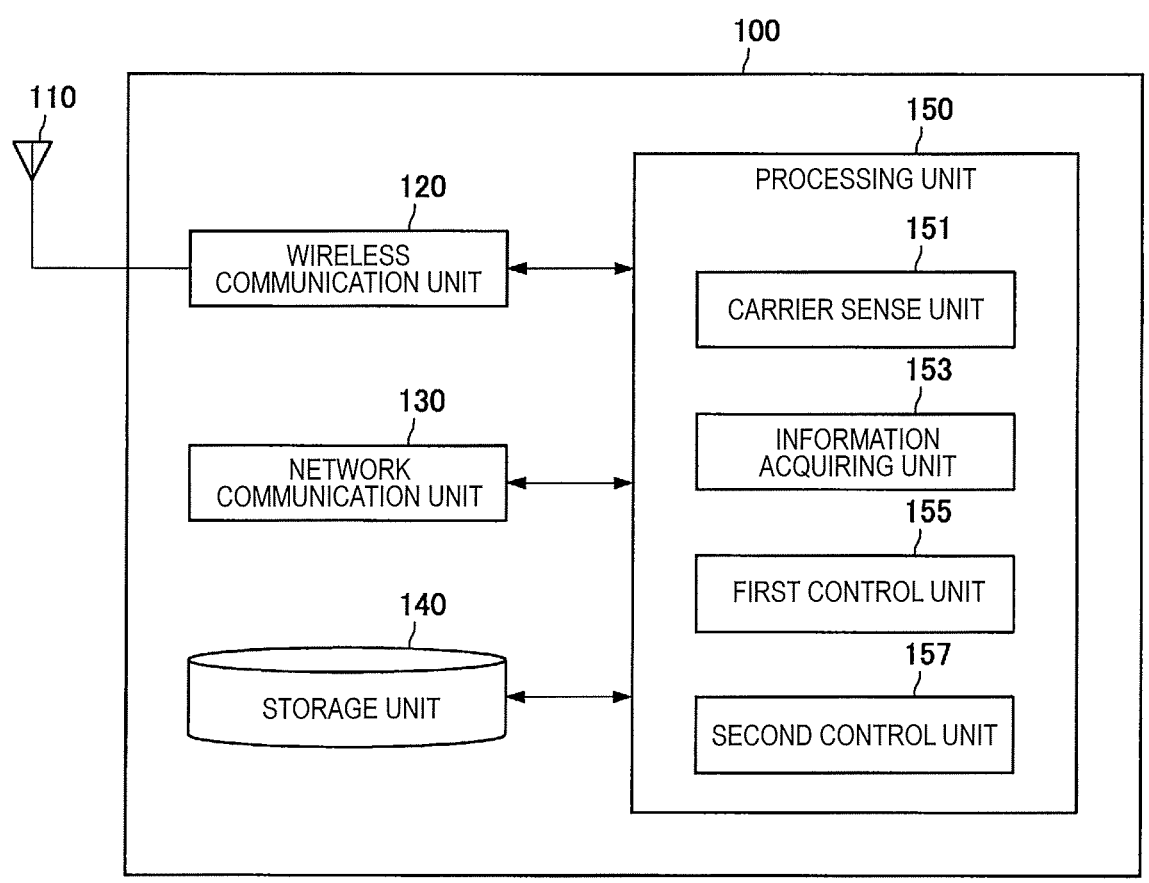
FIG. 7 is a block diagram illustrating an example of a configuration of a base station according to the first embodiment.

Next, an example of the configuration of a base station 100 according to the first embodiment will be described with reference to FIG. 7. FIG. 7 is a block diagram illustrating an example of the configuration of the base station 100 according to the first embodiment. Referring to FIG. 7, the base station 100 is equipped with an antenna unit 110, a wireless communication unit 120, a network communication unit 130, a storage unit 140, and a processing unit 150.

(Antenna Unit 110)

The antenna unit 110 emits a signal output by the wireless communication unit 120 into space as a radio wave. Additionally, the antenna unit 110 converts a radio wave from space into a signal, and outputs the signal to the wireless communication unit 120.

(Wireless Communication Unit 120)

The wireless communication unit 120 performs transmission and reception of a signal. For example, the wireless communication unit 120 performs transmission and reception of a signal using the frequency band for the cellular system and/or the frequency band shared by the cellular system and the wireless LAN (that is, the shared band).

(Network Communication Unit 130)

The network communication unit 130 performs transmission and reception of information. For example, the network communication unit 130 transmits information to another node, and receives information from another node. For example, another node includes another base station and a core network node.

(Storage Unit 140)

The storage unit 140 temporarily or permanently stores programs and data for the operation of the base station 100.

(Processing Unit 150)

The processing unit 150 provides various functions of the base station 100. The processing unit 150 includes a carrier sense unit 151, an information acquiring unit 153, a first control unit 155, and a second control unit 157. The processing unit 150 may further include any component other than these components. In other words, the processing unit 150 can perform an operation other than operations of these components.

(Carrier Sense Unit 151)

The carrier sense unit 151 performs the carrier sense. In other words, the carrier sense unit 151 checks whether or not a signal is transmitted from other nodes using the frequency band or radio resources.

(Information Acquiring Unit 153)

The information acquiring unit 153 acquires information. For example, the information acquiring unit 153 acquires information for the first control unit 155 or the second control unit 157.

(First Control Unit 155)

The first control unit 155 controls wireless communication of the base station 100. For example, the first control unit 155 controls the wireless communication of the base station 100 in the frequency band shared by the cellular system and the wireless LAN (that is, the shared band). Further, for example, the first control unit 155 controls the wireless communication of the base station 100 in the frequency band for the cellular system.

(Second Control Unit 157)

The second control unit 157 gives a notification to another node. For example, another node includes another base station. Further, another node may include a core network.

<2.4. Technical Characteristics of First Embodiment>

Next, technical characteristics of the first embodiment will be described with reference to FIGS. 8 to 11.

(Carrier Sense and Signal Transmission)

(a) Carrier Sense

Particularly, in the first embodiment, the carrier sense unit 151 performs the carrier sense for predetermined radio resources among the radio resources of the shared band (that is, the frequency band shared by the cellular system and the wireless LAN). In other words, the carrier sense unit 151 checks whether or not a signal is transmitted from other nodes through the predetermined radio resources. The predetermined radio resources are not all but some of the radio resources of the shared band.

(b) Transmission of Signal

Particularly, in the first embodiment, the first control unit 155 controls the wireless communication of the base station 100 in the shared band in a manner that a signal is not transmitted through the predetermined radio resources among the radio resources of the shared band, and a signal is transmitted through radio resources other than the predetermined radio resources. The predetermined radio resources are not all but some of the radio resources of the shared band. The other radio resources are also some of the radio resources of the shared band.

(b-1) Specific Process

As an example, the first control unit 155 allocates the radio resources of the shared band. In this case, for example, the first control unit 155 does not allocate the predetermined radio resources to the terminal device but allocates the other radio resources to the terminal device. Thus, for example, the base station 100 and the terminal device do not transmit the signal through the predetermined radio resources.

As another example, the first control unit 155 may map a signal to the radio resources of the shared band. In this case, for example, the first control unit 155 does not map a signal to the predetermined radio resources but maps a signal to the other radio resources. Thus, for example, the base station 100 does not transmit the signal through the predetermined radio resources.

(b-2) Control According to Result of Carrier Sense

The first control unit 155 controls the wireless communication of the base station 100 in the shared band according to the result of the carrier sense. For example, when the result of the carrier sense indicates that no signal is transmitted from other nodes through the predetermined radio resources for a predetermined time, the first control unit 155 controls the wireless communication of the base station 100 in the shared band in a manner that a signal is transmitted through the other radio resources.

(c) Predetermined Radio Resources

For example, the predetermined radio resources are radio resources of a partial band which is a part of the shared band. In other words, the carrier sense unit 151 performs the carrier sense for the radio resources of the partial band. In other words, the carrier sense unit 151 performs the carrier sense for the partial band.

(c-1) Two or More Partial Bands

For example, the predetermined radio resources are radio resources of the two or more partial bands which are parts of the shared band. In other words, the carrier sense is performed through two or more partial bands of the shared band. Further, no signal is transmitted from the base station 100 and the terminal device through the radio resources of the two or more partial bands of the shared band.

It will be appreciated that, in the first embodiment, the predetermined radio resources may be radio resources of one partial band which is a part of the shared band.

(c-2) Example of Partial Band

Fixed Band

For example, the partial band is a fixed band that does not vary periodically. This point will be described below with reference to FIG. 8 using a specific example.

Figure 8:
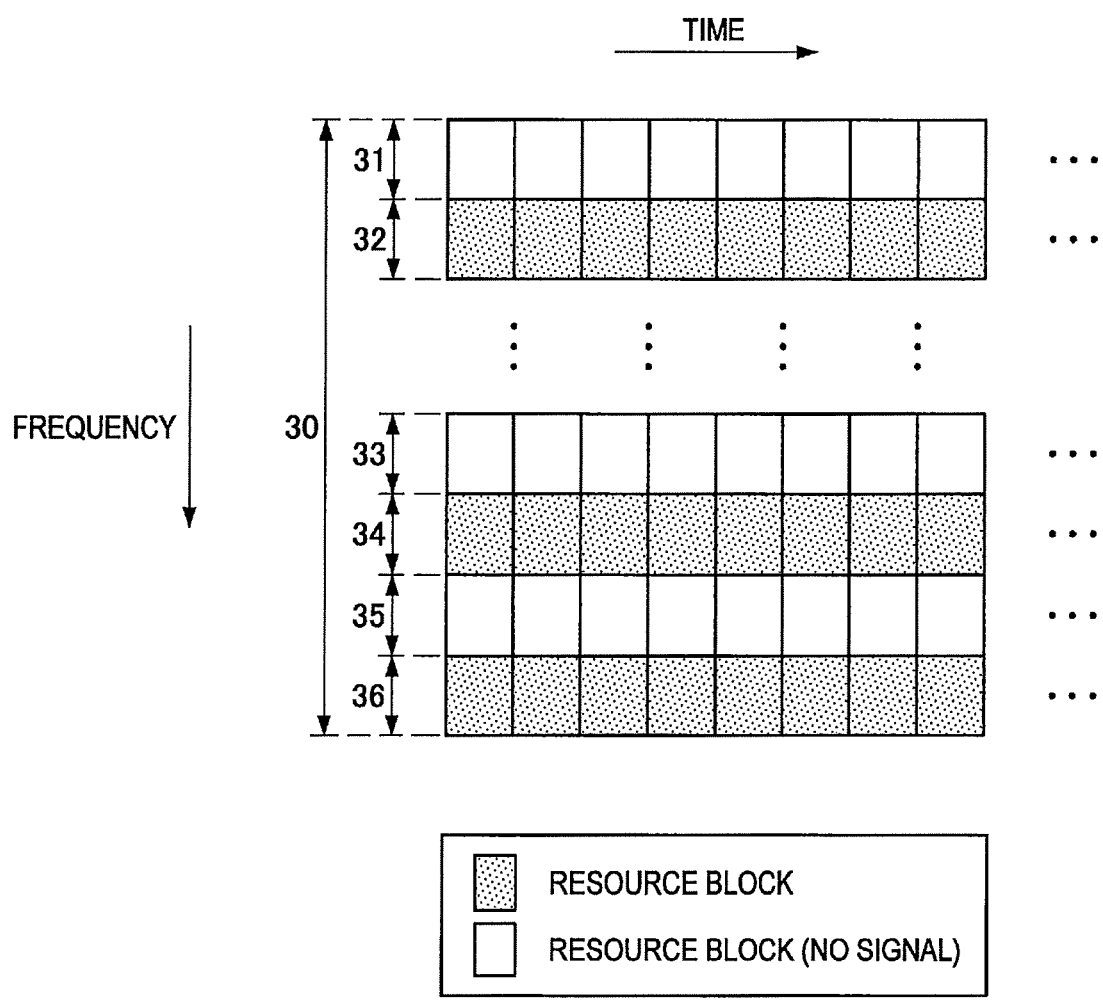
FIG. 8 is an explanatory diagram for describing a first example of predetermined radio resources according to the first embodiment.

FIG. 8 is an explanatory diagram for describing a first example of the predetermined radio resources according to the first embodiment. Referring to FIG. 8, resource blocks of the shared band 30 and the shared band 30 are illustrated. In this example, the base station 100 performs the carrier sense for resource blocks of the partial bands 31, 33, and 35 which are parts of the shared band 30. In other words, the base station 100 performs the carrier sense for the partial bands 31, 33, and 35 which are parts of the shared band 30. Further, when the result of the carrier sense indicates that no signal is transmitted from other nodes through the resource blocks of the partial bands 31, 33, and 35 for a predetermined time, for example, the base station 100 (and/or the terminal device) transmits a signal through resource blocks of other partial bands 32, 34, and 36. The base station 100 (and/or the terminal device) does not transmit a signal, for example, through the resource blocks of the partial bands 31, 33, and 35.

For example, there are the base station 100A and the base station 100B as illustrated in FIG. 6. In this case, for example, the base station 100A performs the carrier sense for the resource blocks of the partial bands 31, 33, and 35, and the base station 100B transmits a signal through the resource blocks of the other partial bands 32, 34, and 36. As a result, the base station 100A does not detect a signal transmitted from the base station 100B in the carrier sense.

Variable Band

The partial band may be a band that varies periodically. For example, the partial band may be a band that varies periodically according to a predetermined pattern. This point will be described below with reference to FIG. 9 using a specific example.

Figure 9:
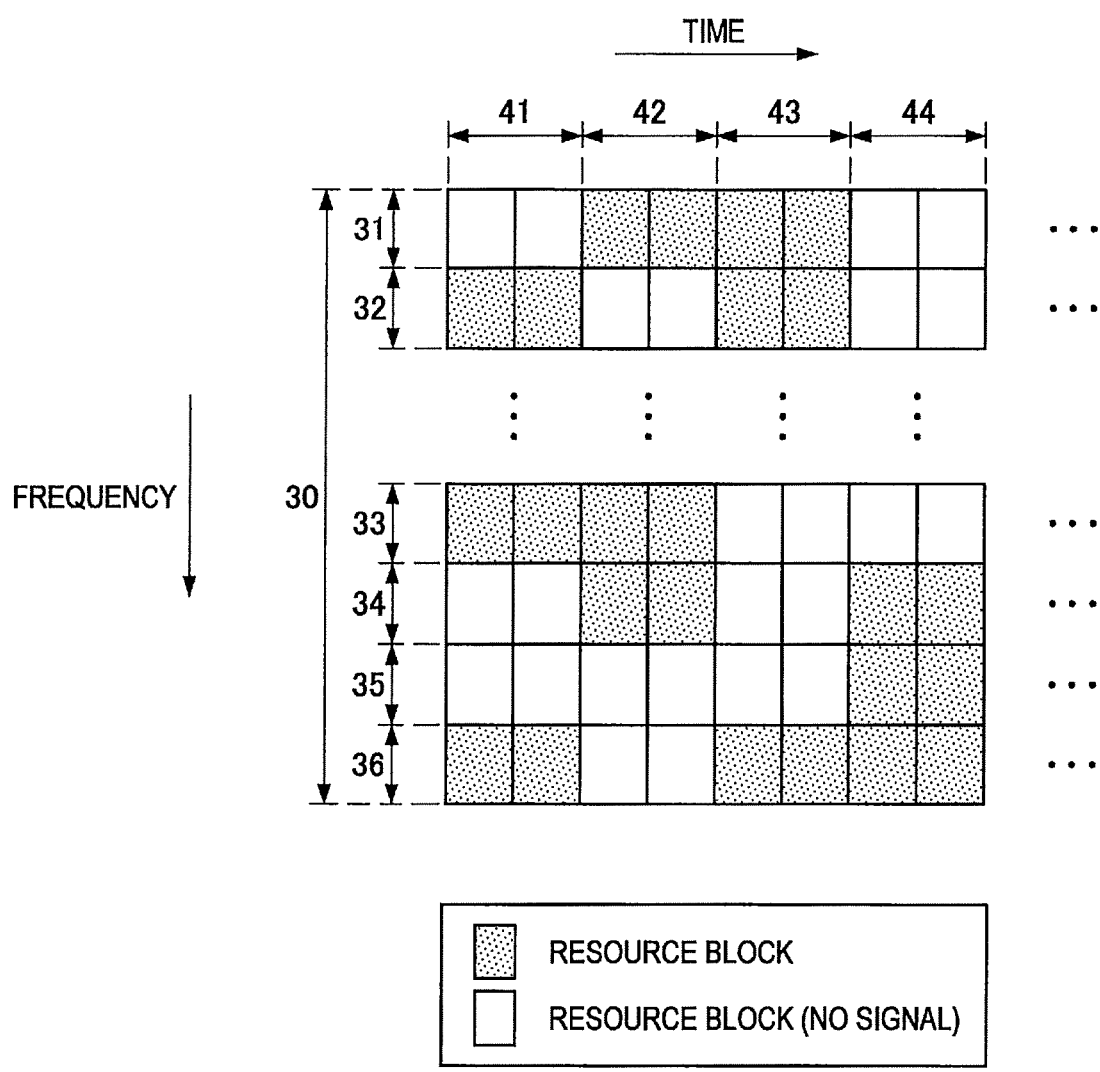
FIG. 9 is an explanatory diagram for describing a second example of predetermined radio resources according to the first embodiment.

FIG. 9 is an explanatory diagram for describing the second example of the predetermined radio resources according to the first embodiment. Referring to FIG. 9, resource blocks of the shared band 30 and the shared band 30 are illustrated. The base station 100 performs the carrier sense for the radio resources of the partial band that varies periodically according to a predetermined pattern. For example, the base station 100 performs the carrier sense for the resource blocks of the partial bands 31, 34, and 35 in a sub frame 41. In other words, the base station 100 performs the carrier sense for the partial bands 31, 34, and 35 in the sub frame 41. The base station 100 performs the carrier sense for the partial bands 32, 35, and 36 in a sub frame 42, performs the carrier sense for the partial bands 33, 34, and 35 in a sub frame 43, and performs the carrier sense for the partial bands 31, 32, and 33 in a sub frame 44. Further, when the result of the carrier sense indicates that no signal is transmitted from other nodes through the partial band that varies periodically according to the predetermined pattern for a predetermined time, the base station 100 (and/or the terminal device) transmits a signal through, for example, radio resources of other partial bands. In this example, the base station 100 (and/or the terminal device) transmits a signal through the resource blocks of the partial bands 32, 33, and 36 in the sub frame 41. The base station 100 (and/or the terminal device) transmits a signal through the resource blocks of the partial bands 31, 33, and 34 in the sub frame 42, transmits a signal through the resource blocks of the partial bands 31, 32, and 36 in the sub frame 43, and transmits a signal through the resource blocks of the partial bands 34, 35, and 36 through the sub frame 44.

For example, there are the base station 100A and the base station 100B as illustrated in FIG. 6. In this case, for example, in the sub frame 41, the base station 100A performs the carrier sense for the partial bands 31, 34, and 35, and the base station 100B transmits a signal through the resource blocks of other partial bands 32, 33, and 36. As a result, the base station 100A does not detect a signal transmitted from the base station 100B in the carrier sense.

The partial band may be a band that varies by sub frame as illustrated in FIG. 9 or may be a band that varies by another period. As an example, the partial band may be a band that varies by a predetermined number of sub frames or may be a band that varies by a predetermined number of radio frames. The predetermined pattern may be a pattern that is repeated at intervals of predetermined periods (for example, intervals of a predetermined number of radio frames).

(c-3) Others

Control Region and Data Region

For the shared band, there may be a control region and a data region. In this case, the predetermined radio resources may be radio resources of the data region including no radio resources of the control region. For example, the carrier sense for the radio resources of the data region among the radio resources of the partial band may be performed, and no signal may be transmitted through the radio resources.

On the other hand, the other radio resources (through which a signal is transmitted) may include the radio resources of the control region and the radio resources of the data region. For example, a signal may be transmitted through the radio resources of the control region of the shared band and the radio resources of the data region of the other partial bands which are parts of the shared band.

The control region may be a region in which a physical control channel is arranged. In other words, the predetermined radio resources may not include radio resources of the physical control channel. The physical control channel may include a physical downlink control channel (PUCCH). The data region may be a region other than the control region. As an example, the control region may be a region of a sub frame corresponding to a predetermined number of symbols, and the data region may be a region of a sub frame corresponding to other symbols.

Predetermined Period

The predetermined radio resources may be radio resources within a predetermined period. For example, the carrier sense for the radio resources of the partial band may be performed in the predetermined period, and no signal may be transmitted through the radio resources in the predetermined period.

On the other hand, the other radio resources (through which a signal is transmitted) may include radio resources within the predetermined period and radio resources of other periods. For example, in the predetermined period, a signal may be transmitted through the radio resources of the other partial bands which are parts of the shared band, or a signal may be transmitted through the radio resources of the entire shared band in other periods.

Predetermined Resource Element

The predetermined radio resources may be not the radio resources of the partial band but other radio resources. As an example, the predetermined radio resources may be radio resources of one or more discrete sub carriers (for example, resource elements).

(d) Other Radio Resources

For example, the radio resources other than the predetermined radio resources include radio resources of other partial bands which are parts of the shared band. In other words, (in at least one of periods) the base station 100 (and/or the terminal device) does not transmit a signal through the partial band but transmits a signal through the other partial bands. This point will be described with reference to FIGS. 8 and 9.

Accordingly, for example, it is possible to suppress the wireless communication of the wireless LAN node while preventing detection of a signal by other base stations in the carrier sense.

(e) Example of Carrier Sense and Signal Transmission

Figure 10:
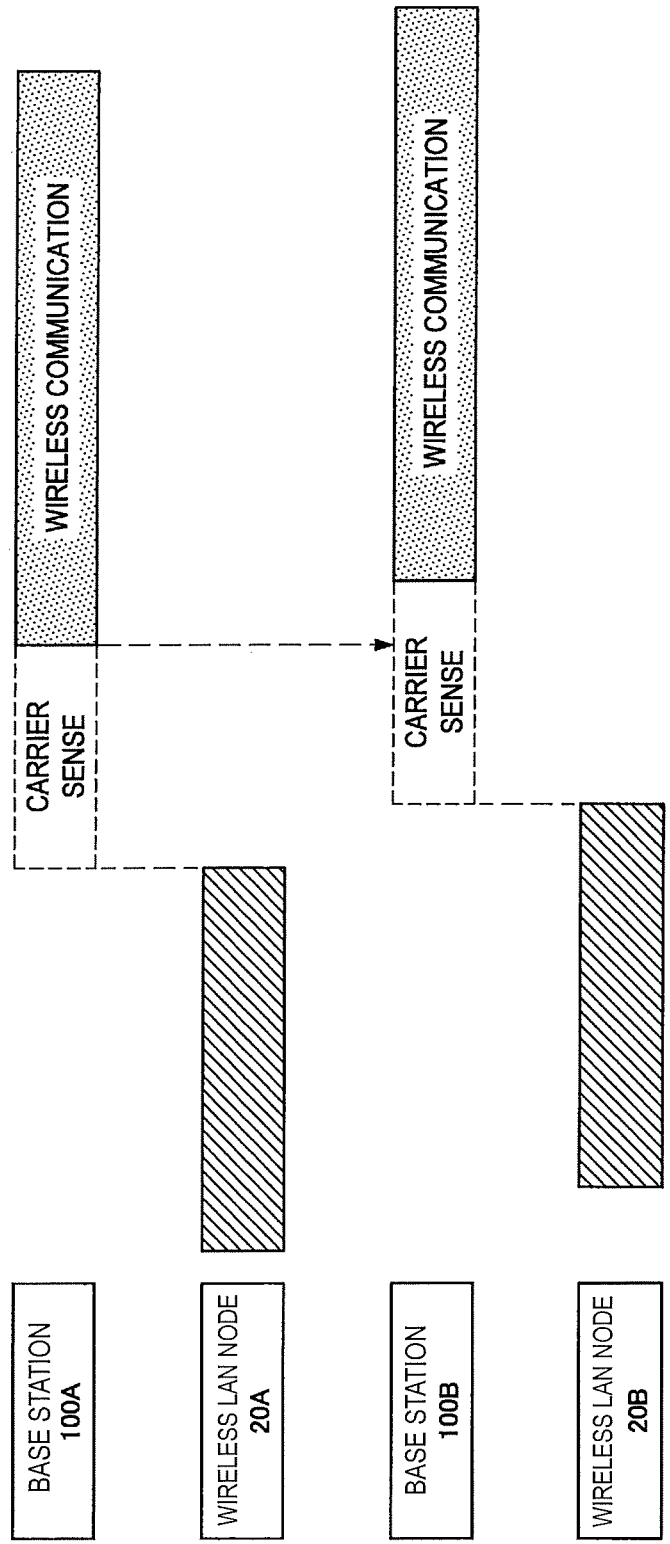
FIG. 10 is an explanatory diagram for describing a first example of carrier sense and signal transmission according to the first embodiment.

FIG. 10 is an explanatory diagram for describing a first example of the carrier sense and the signal transmission according to the first embodiment. When transmission of a signal by the wireless LAN node 20A using the shared band ends, the base station 100A performs the carrier sense for predetermined radio resources among the radio resources of the shared band. Thereafter, the base station 100A (and/or the terminal device) transmits a signal through radio resources other than the predetermined radio resources. On the other hand, when transmission of a signal by the wireless LAN node 20B using the shared band ends, the base station 100B performs the carrier sense for predetermined radio resources. Here, since the base station 100A (and/or the terminal device) transmits a signal through radio resources other than the predetermined radio resources, the base station 100B does not detect a signal transmitted from the base station 100A (and/or the terminal device) in the carrier sense. As a result, after the carrier sense, the base station 100B (and/or the terminal device) transmits a signal through radio resources other than the predetermined radio resources.

As described above, the carrier sense for the predetermined radio resources among the radio resources of the shared band is performed, and a signal is transmitted through radio resources other than the predetermined radio resources. Accordingly, for example, it is possible to use the frequency band shared by the cellular system and the wireless LAN (that is, the shared band) in the cellular system more flexibly. More specifically, for example, competition between the nodes of the cellular system is prevented in the shared band. Thus, the nodes of the cellular system can use the shared band regardless of the use status of the shared band by other nodes. In other words, the shared band can be more flexibly used in the cellular system.

Further, it is unnecessary to check whether a signal transmitted using the shared band is a signal transmitted by the wireless LAN node or a signal transmitted by the node of the cellular system based on the details of the signal. Further, it is unnecessary to decode the signal. For this reason, an increase in complexity can be prevented.

(Notification of Termination Timing to Other Base Stations)

For example, the information acquiring unit 153 acquires information indicating a timing at which the base station 100 ends the wireless communication using the shared band (that is, the frequency band shared by the cellular system and the wireless LAN) (hereinafter referred to as "first timing information."). Then, the second control unit 157 gives a notification indicating the timing to one or more other base stations.

(a) First Timing Information

For example, the first timing information is generated by the processing unit 150.

The first timing information may be information indicating a timing at which the base station 100 ends the wireless communication using the shared band or may be information indicating a radio frame and/or a sub frame in which the base station 100 ends the wireless communication using the shared band. The first timing information is not limited to this example and may be any other information.

(b) One or More Base Stations

For example, each of one or more base stations is a base station near the base station 100. For example, one or more base stations include the base station of the cellular system including the base station 100.

Further, one or more base stations may include a base station of another cellular system different from the cellular system. Thus, competition between the cellular systems can be prevented. Further, the cellular system may be a system of a first operator, and another cellular system may be a system of a second operator different from the first operator. Thus, competition between the cellular systems of the different operators can be prevented.

(c) Notification of Timing

For example, the second control unit 157 gives a notification of the timing to one or more base stations through the transmission of the first timing information. For example, the second control unit 157 transmits the first timing information to one or more other base stations through the network communication unit 130.

As described above, the base station 100 gives a notification of the timing to one or more other base stations. Thus, for example, the wireless communication of the base stations using the shared band can be set to end at the same timing. As a result, it is possible to prevent a situation in which a specific wireless LAN node is unable to perform wireless communication for a long time.

Referring back to FIG. 6, for example, the wireless LAN node 20A receives the signal transmitted from the base station 100A but does not receive the signal transmitted from the base station 100B. Thus, for example, the wireless LAN node 20A is unable to perform wireless communication using the shared band while the base station 100A is transmitting the signal. The wireless LAN node 20B receives the signal transmitted from the base station 100B but does not receive the signal transmitted from the base station 100A. Thus, the wireless LAN node 20B is unable to perform wireless communication using the shared band while the base station 100B is transmitting the signal. The wireless LAN node 20C receives the signal transmitted from the base station 100A and the signal transmitted from the base station 100B. Thus, the wireless LAN node 20C is unable to perform wireless communication using the shared band while at least one of the base station 100A and the base station 100B is transmitting the signal. In this case, the wireless LAN node 20C is unable to perform wireless communication for a longer time than the wireless LAN node 20A and the wireless LAN node 20B. In this regard, as described above, since the base station 100A and the base station 100B are set to end the wireless communication using the shared band at the same timing, a time in which the wireless LAN node 20C is unable to perform wireless communication using the shared band can be further reduced. In other words, it is possible to suppress a decrease in opportunities for the wireless communication of the wireless LAN node 20C in the shared band.

(End of Wireless Communication Using Shared Band)

For example, the information acquiring unit 153 acquires information indicating a timing at which another base station ends the wireless communication using the shared band (hereinafter referred to as "second timing information"). Then, the first control unit 155 ends the wireless communication of the base station 100 in the shared band according to the timing.

(a) Second Timing Information

For example, the second timing information is information which is transmitted from another base station to the base station 100 and stored in, for example, the storage unit 140. The information acquiring unit 153 acquires the second timing information from the storage unit 140.

The second timing information may be a timing at which another base station ends the wireless communication using the shared band or may be information indicating a radio frame and/or a sub frame in which the base station 100 ends the wireless communication using the shared band. The first timing information is not limited to this example and may be any other information.

(b) Other Base Station

For example, another base station is a base station near the base station 100. For example, another base station is a base station of the cellular system including the base station 100.

Further, another base station may be a base station of another cellular system different from the cellular system. Thus, competition between the cellular systems can be prevented. Further, the cellular system may be a system of a first operator, and another cellular system may be a system of a second operator different from the first operator. Thus, competition between the cellular systems of the different operators can be prevented.

(c) End of Wireless Communication Using Shared Band

For example, the first control unit 155 ends the wireless communication of the base station 100 in the shared band at the timing. This point will be described below with reference to FIG. 11 using a specific example.

Figure 11:
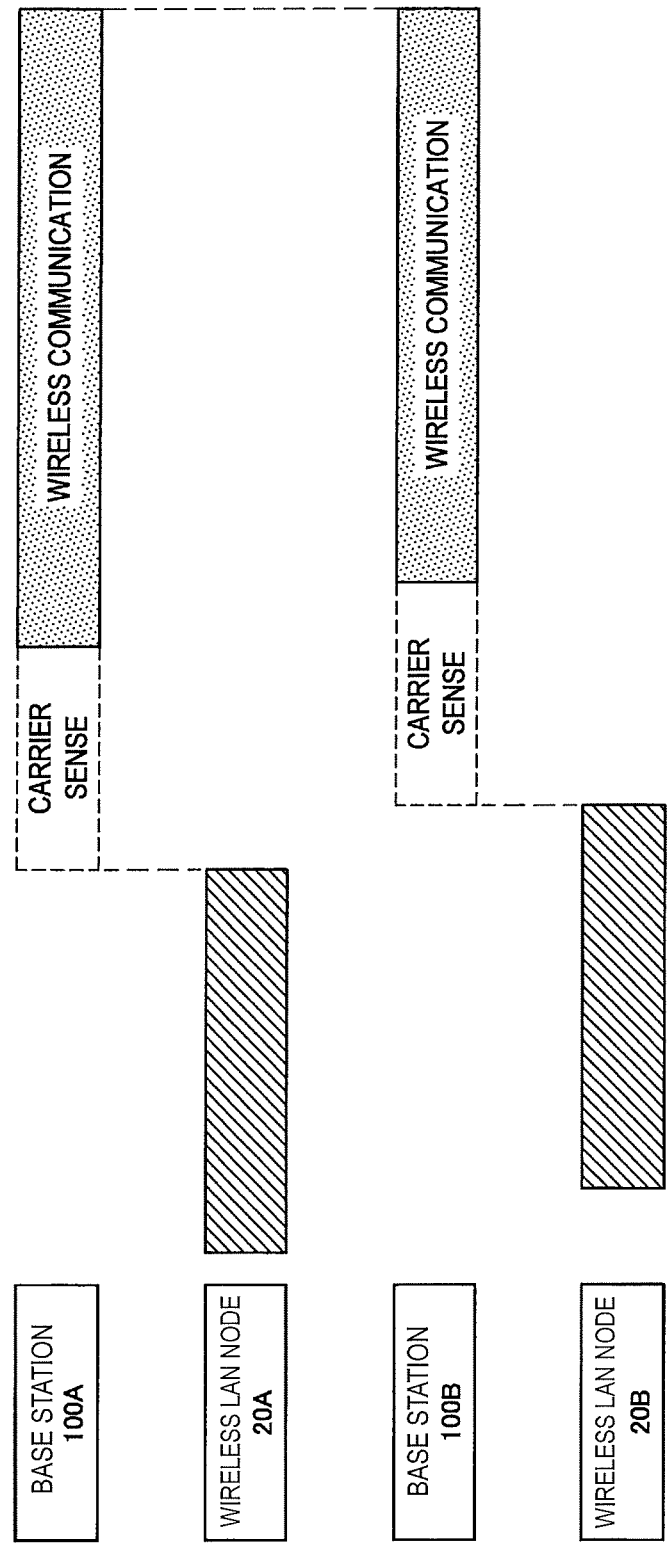
FIG. 11 is an explanatory diagram for describing a second example of carrier sense and signal transmission according to the first embodiment.

FIG. 11 is an explanatory diagram for describing the second example of the carrier sense and the signal transmission according to the first embodiment. Similarly to the example described above with reference to FIG. 10, the base station 100A starts the wireless communication using the shared band after the carrier sense. The, the base station 100A gives a notification indicating a timing at which the base station 100A ends the wireless communication using the shared band to the base station 100B. Further, similarly to the example described above with reference to FIG. 10, the base station 100B also starts the wireless communication using the shared band after the carrier sense. Thereafter, the base station 100A and the base station 100B end the wireless communication using the shared band at the timing.

As an example of a specific process, the first control unit 155 does not allocate the radio resources of the shared band after the timing to the terminal device. As another example, the first control unit 155 does not map a signal to the radio resources of the shared band after the timing.

As described above, the wireless communication of the base station 100 in the shared band ends at a timing at which another base station ends the wireless communication using the shared band. Thus, for example, the wireless communication of the base stations using the shared band can be set to end at the same timing. As a result, it is possible to prevent a situation in which a specific wireless LAN node is unable to perform wireless communication for a long time.

<2.5. Flow of Process>

Next, the flow of a process according to the first embodiment will be described with reference to FIGS. 12 and 13.

(First Process)

Figure 12:
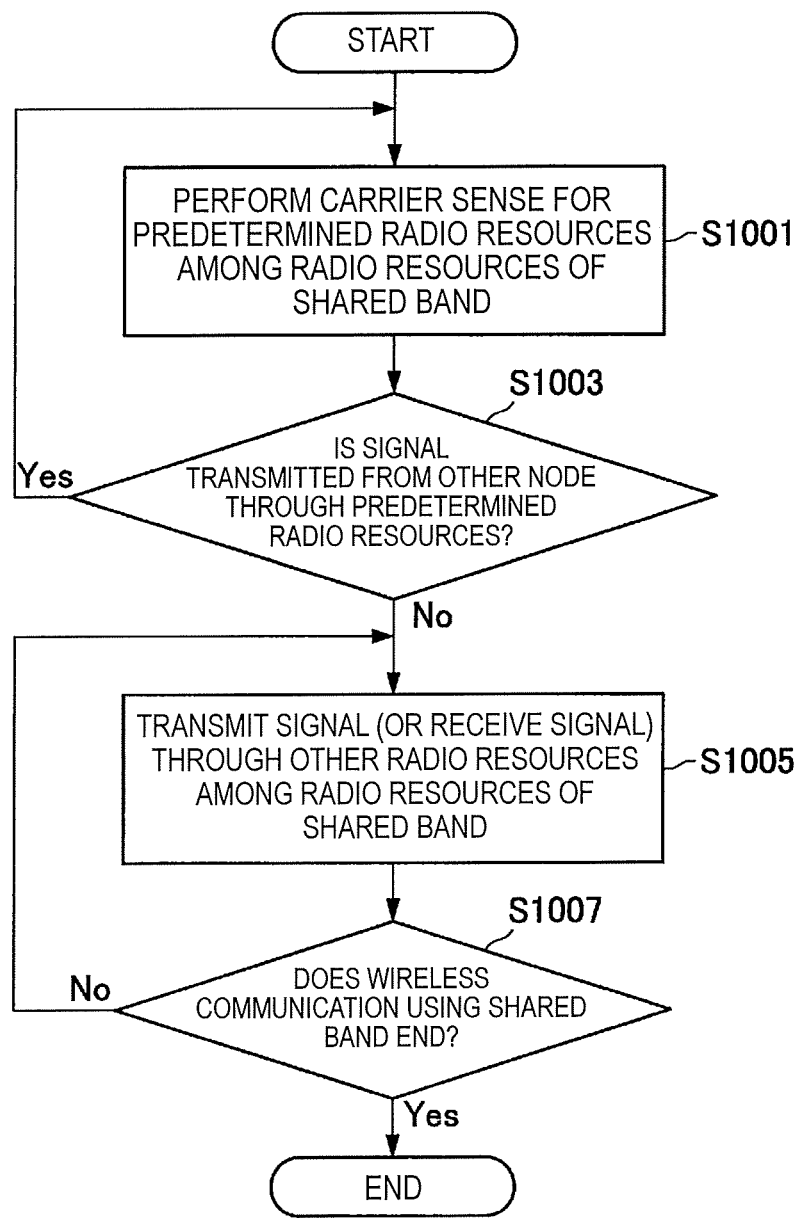
FIG. 12 is a flowchart illustrating an example of a schematic flow of a first process according to the first embodiment.

FIG. 12 is a flowchart illustrating an example of a schematic flow of a first process according to the first embodiment. The first process is a process related to the carrier sense and transmission and reception of a signal.

The base station 100 (the carrier sense unit 151) performs the carrier sense for predetermined radio resources among the radio resources of the shared band (S1001).

When the result of the carrier sense indicates that a signal is transmitted from another node through the predetermined radio resources (YES in S1003), the process returns to step S1001. When the result of the carrier sense indicates that no signal is transmitted from other nodes through the predetermined radio resources for a predetermined time (NO in S1003), the process proceeds to step S1005.

The base station 100 does not transmit (or receive) a signal through the predetermined radio resources among the radio resources of the shared band and transmits a signal (or receives) through other radio resources among the radio resources of the shared band (S1005). Further, the first control unit 155 of the base station 100 controls the wireless communication of the base station 100 in the shared band in a manner that a signal is not transmitted through the predetermined radio resources, and a signal is transmitted through the other radio resources.

When the wireless communication using the shared band ends (YES in S1007), the process ends. When the wireless communication using the shared band does not end (NO in S1007), the process returns to step S1005.

(Second Process)

Figure 13:
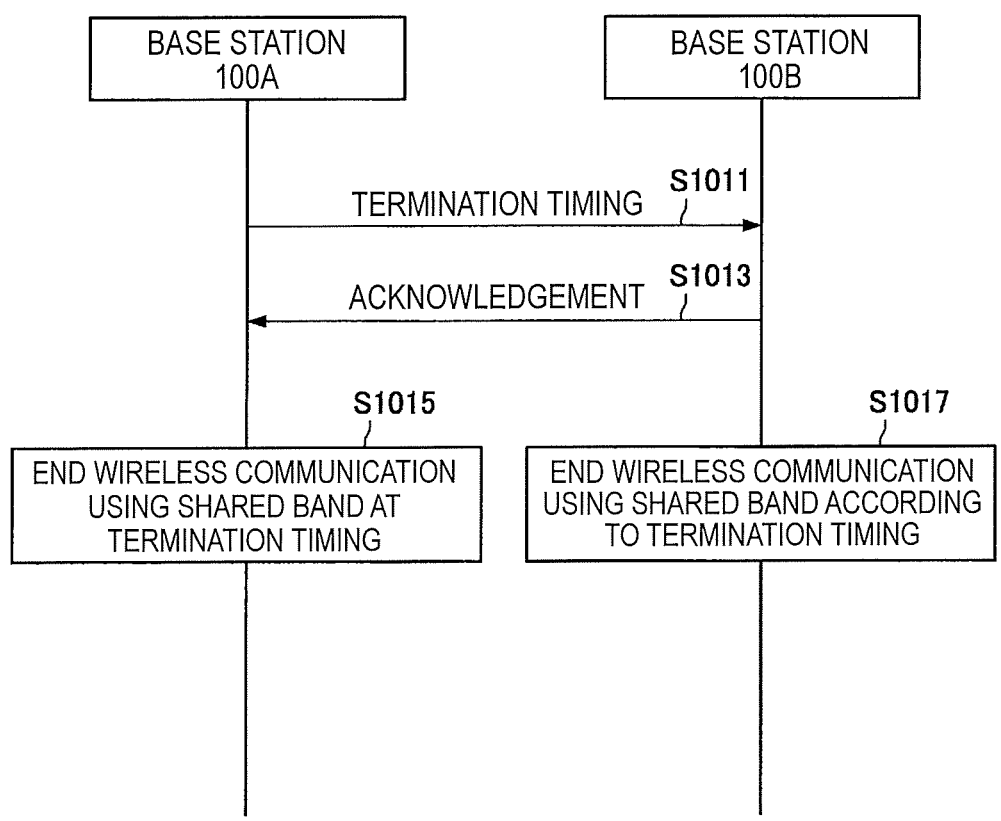
FIG. 13 is a sequence diagram illustrating an example of a schematic flow of a second process according to the first embodiment.

FIG. 13 is a sequence diagram illustrating an example of a schematic flow of a second process according to the first embodiment. The second process is a process related to the end of the wireless communication using the shared band.

The base station 100A gives a notification indicating a timing (a termination timing) at which the base station 100A ends the wireless communication using the shared band to the base station 100B (S1011).

The base station 100B transmits an acknowledgement of the notification to the base station 100A.

Thereafter, the base station 100A ends the wireless communication using the shared band at the termination timing (S1015).

Further, the base station 100B ends the wireless communication using the shared band according to the termination timing (S1017). For example, the base station 100B ends the wireless communication using the shared band at the termination timing.

3. Second Embodiment

Figure 14:
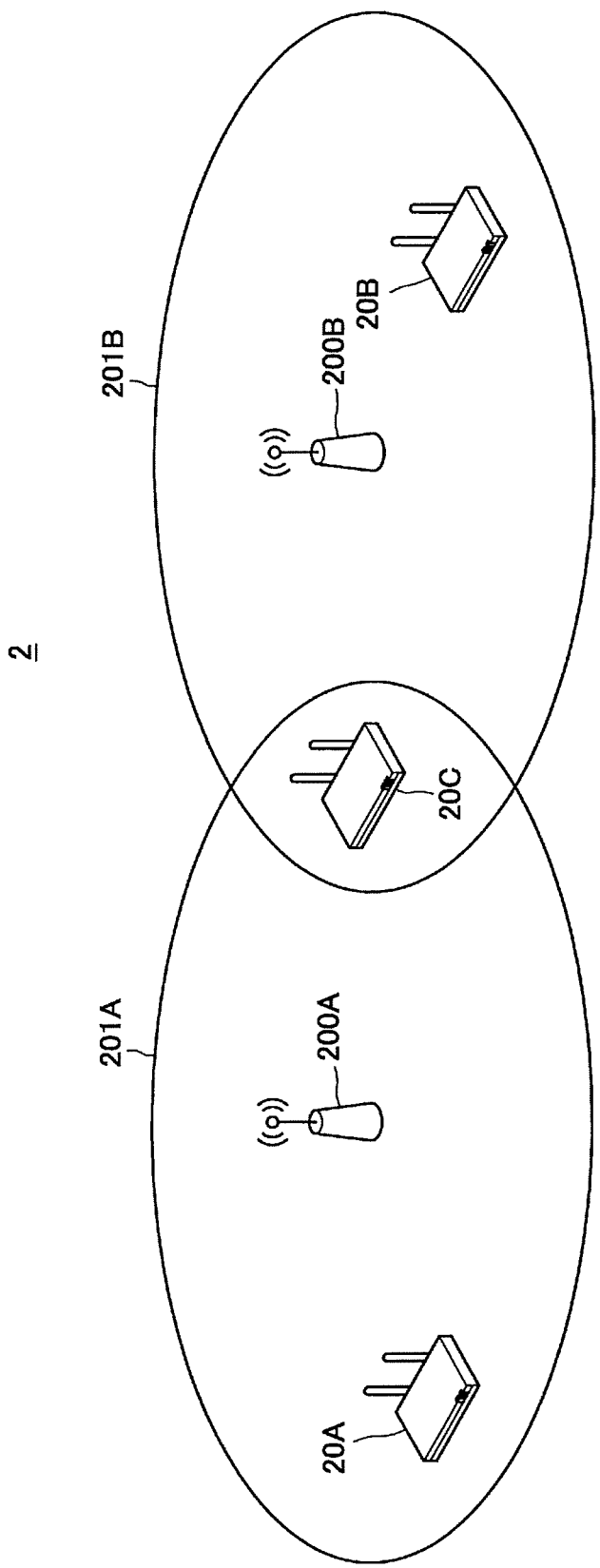
FIG. 14 is an explanatory diagram illustrating an example of a schematic configuration of a communication system according to a second embodiment.
Figure 15:
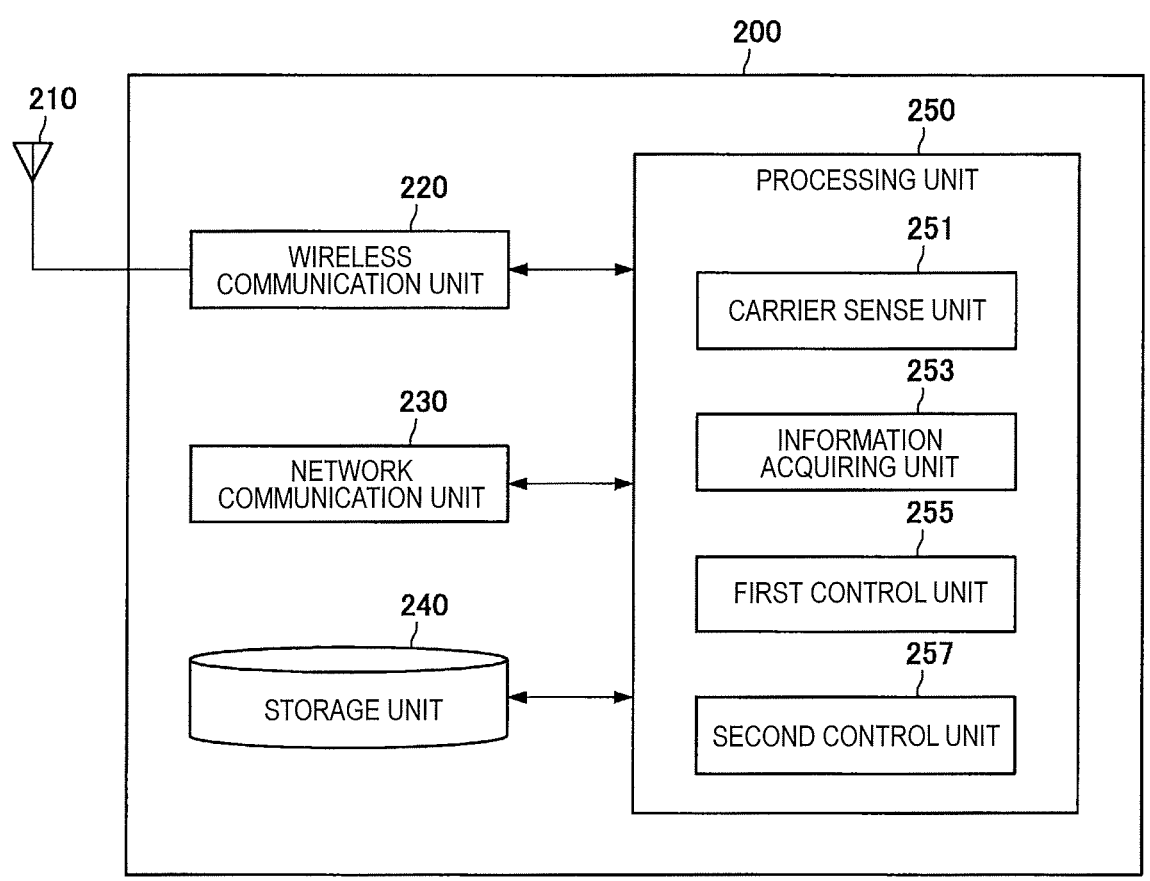
FIG. 15 is a block diagram illustrating an example of a configuration of a base station according to the second embodiment.

Next, a second embodiment will be described with reference to FIGS. 14 and 15.

<3.1. Overview>

(Technical Problem)

For example, the frequency band (for example, the channel of the wireless LAN included in the band of 5 GHz) is shared between the cellular system and the wireless LAN. However, in this case, a specific wireless LAN node is unable to perform wireless communication for a long time.

Referring back to FIG. 3, for example, the wireless LAN node 20A receives the signal transmitted from the base station 10A but does not receive the signal transmitted from the base station 10B. The wireless LAN node 20B receives the signal transmitted from the base station 10B but does not receive the signal transmitted from the base station 10A. The wireless LAN node 20C receives the signal transmitted from the base station 10A and the signal transmitted from the base station 10B. Thus, for example, the wireless LAN node 20A is unable to perform wireless communication using the shared band while the base station 10A is transmitting the signal. Thus, the wireless LAN node 20B is unable to perform wireless communication using the shared band while the base station 10B is transmitting the signal. Thus, the wireless LAN node 20C is unable to perform wireless communication using the shared band while at least one of the base station 10A and the base station 10B is transmitting the signal. For this reason, the wireless LAN node 20C may become unable to perform wireless communication for a longer time than the wireless LAN node 20A and the wireless LAN node 20B.

In this regard, it is desirable to provide a mechanism which is capable of preventing a situation in which a specific wireless LAN node is unable to perform wireless communication for a long time.

(Solution)

In the second embodiment, the base station 100 gives a notification indicating a timing at which the base station 100 ends wireless communication using the frequency band shared by the cellular system and the wireless LAN to one or more other base stations.

In the second embodiment, the base station 100 ends wireless communication using the frequency band according to a timing at which another base station ends wireless communication using the frequency band shared by the cellular system and the wireless LAN.

Accordingly, it is possible to prevent a situation in which a specific wireless LAN node is unable to perform wireless communication for a long time.

<3.2. Schematic Configuration of Communication System>

Next, a schematic configuration of a communication system 2 according to the second embodiment will be described with reference to FIG. 14. FIG. 14 is an explanatory diagram illustrating an example of a schematic configuration of the communication system 2 according to the second embodiment. Referring to FIG. 14, the communication system 2 includes a base station 200 and a wireless LAN node 20.

Description of a schematic configuration of the communication system 2 is similar to the description of the schematic configuration of the communication system 1 according to the first embodiment except that reference numerals are different. Thus, repeated description is omitted. For the sake of description of the schematic configuration of the communication system 2 according to the second embodiment, the "base station 100" and the "cell 101" described in the schematic configuration of the communication system 1 according to the first embodiment are replaced with a "base station 200" and a "cell 201," respectively.

<3.3. Configuration of Base Station>

Next, an example of a configuration of the base station 200 according to the second embodiment will be described with reference to FIG. 15. FIG. 15 is a block diagram illustrating an example of a configuration of the base station 200 according to the second embodiment. Referring to FIG. 15, the base station 200 includes an antenna unit 210, a wireless communication unit 220, a network communication unit 230, a storage unit 240, and a processing unit 250.

Description of a configuration of the base station 200 is similar to the description of the configuration of the base station 100 according to the first embodiment except that reference numerals are different. Thus, repeated description is omitted. For the sake of description of the base station 200 according to the second embodiment, the "base station 100," the "antenna unit 110," the "wireless communication unit 120," the "network communication unit 130," the "storage unit 140," the "processing unit 150," the "carrier sense unit 151," the "information acquiring unit 153," the "first control unit 155," and the "second control unit 157" described in the configuration of the base station 100 according to the first embodiment are replaced with a "base station 200," an "antenna unit 210," a "wireless communication unit 220," a "network communication unit 230," a "storage unit 240," a "processing unit 250," a "carrier sense unit 251," an "information acquiring unit 253," a "first control unit 255," and a "second control unit 257," respectively.

<3.4. Technical Characteristics of Second Embodiment>

Next, technical characteristics of the second embodiment will be described.

(Notification of Termination Timing to Other Base Station)

For example, the information acquiring unit 253 acquires information indicating a timing at which the base station 200 ends wireless communication using the shared band (that is, the frequency band shared by the cellular system and the wireless LAN) (hereinafter referred to as "first timing information"). Then, the second control unit 257 gives a notification indicating the timing to one or more other base stations.

The first embodiment and the second embodiment do not differ in description of this point except that reference numbers and drawing numbers are different. Thus, repeated description is omitted. For the sake of description of this point in the second embodiment, the "network communication unit 130," the "processing unit 150," the "information acquiring unit 153," the "second control unit 157," and "FIG. 6" described in connection with this point in the first embodiment are replaced with a "network communication unit 230," a "processing unit 250," an "information acquiring unit 253," a "second control unit 257," and "FIG. 14," respectively.

(End of Wireless Communication Using Shared Band)

For example, the information acquiring unit 253 acquires information indicating a timing at which another base station ends the wireless communication using the shared band (hereinafter referred to as "second timing information"). Then, the first control unit 255 ends the wireless communication of the base station 200 in the shared band according to the timing.

The first embodiment and the second embodiment do not differ in description of this point except that reference numbers and drawing numbers are different. Thus, repeated description is omitted. For the sake of description of this point in the second embodiment, the "storage unit 140," the "processing unit 150," the "information acquiring unit 153," and the "first control unit 155" described in connection with this point in the first embodiment are replaced with a "storage unit 240," a "processing unit 250," an "information acquiring unit 253," and a "first control unit 255," respectively.

<2.5. Flow of Process>

Next, the flow of a process according to the second embodiment will be described.

Description of a process according to the second embodiment is similar to description of the second process according to the first embodiment. Thus, repeated description is omitted. For the sake of description of the process according to the second embodiment, the "base station 100A" and the "base station 100B" described in the second process according to the first embodiment are replaced with the "base station 200A" and the "base station 200B," respectively.

4. Third Embodiment

Next, a third embodiment will be described with reference to FIGS. 16 to 21.

<4.1. Overview>

(Technical Problem)

Description of a technical problem related to the third embodiment is similar to the description of the technical problem related to the first embodiment. Thus, repeated description is omitted here.

(Solution)

In the third embodiment, a representative base station of the cellular system performs the carrier sense for the frequency band shared by the cellular system and the wireless LAN. Further, when the result of the carrier sense indicates that the frequency band is usable, the representative base station gives a notification to one or more base stations corresponding to the representative base station.

Further, in the third embodiment, the base station performs wireless communication using the frequency band according to the notification which is given to the base station from the representative base station of the cellular system that performs the carrier sense for the frequency band shared by the cellular system and the wireless LAN when the result of the carrier sense indicates that the frequency band is usable.

Accordingly, for example, the frequency band shared by the cellular system and the wireless LAN (that is, the shared band) can be more flexibly used in the cellular system.

<4.2. Schematic Configuration of Communication System>

Figure 16:
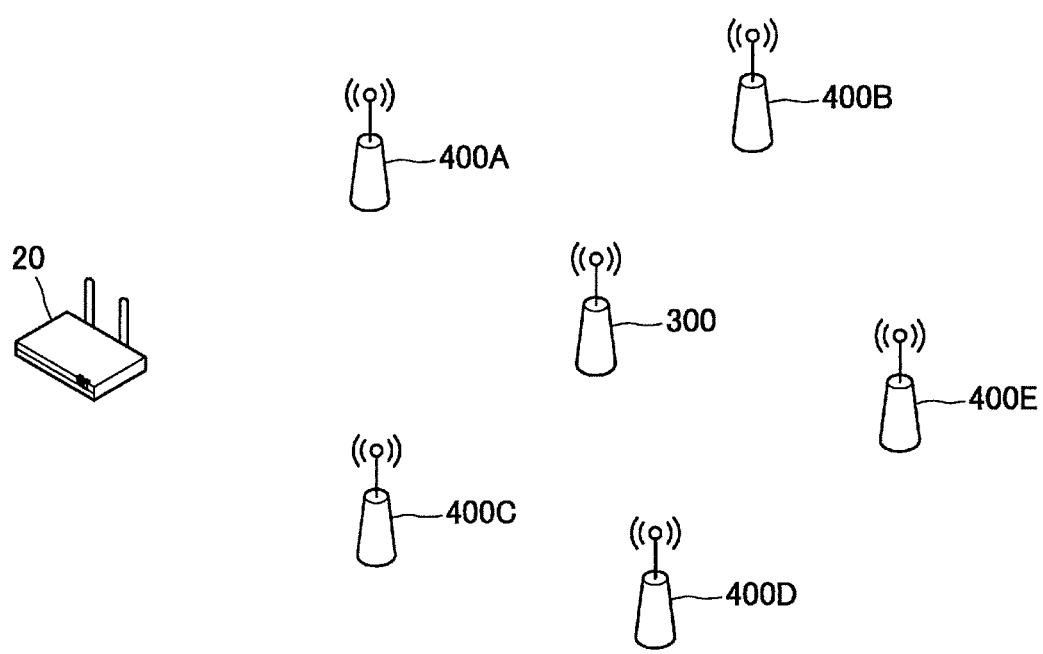
FIG. 16 is an explanatory diagram illustrating an example of a schematic configuration of a communication system according to a third embodiment.

Next, a schematic configuration of a communication system 3 according to the third embodiment will be described with reference to FIG. 16. FIG. 16 is an explanatory diagram illustrating an example of a schematic configuration of the communication system 3 according to the third embodiment. Referring to FIG. 16, the communication system 3 includes a base station 300, a base station 400, and a wireless LAN node 20.

(Base stations 300 and 400)

Each of the base station 300 and the base station 400 is a base station of the cellular system. For example, the cellular system is a system conforming to LTE, LTE-Advanced, or a communication standard equivalent thereto.

(a) Relation Between Base Station 300 and Base Station 400

Particularly, in the third embodiment, the base station 300 is the representative base station of the cellular system. On the other hand, the base station 400 is a base station corresponding to the base station 300 (that is, the representative base station).

As an example, the base station 300 (the representative base station) is a base station which is a cluster head of a small cell cluster. In this case, the base station 400 is another base station that constitutes the small cell cluster.

As another example, the base station 300 (the representative base station) may be a base station of the macro cell. In this case, the base station 400 is a base station of the small cell overlapping the macro cell.

(b) Frequency Band

Each of the base station 300 and the base station 400 performs wireless communication using the frequency band for the cellular system. For example, the frequency band is a component carrier for the cellular system.

Particularly, in the third embodiment, each of the base station 300 and the base station 400 further performs wireless communication using the frequency band shared by the cellular system and the wireless LAN (that is, the shared band). For example, the shared band is a channel of the wireless LAN. More specifically, for example, the shared band is a channel of a band of 5 GHz (or a band of 2.4 GHz) and has a bandwidth of 20 MHz.

The frequency band for the cellular system is a licensed band or a frequency band included in the licensed band. The shared band is the unlicensed band or the frequency band included in the unlicensed band.

(c) Wireless Communication with Terminal Device

Each of the base station 300 and the base station 400 performs wireless communication with the terminal device. For example, each of the base station 300 and the base station 400 transmits a downlink signal to the terminal device and receives an uplink signal from the terminal device.

(Wireless LAN Node 20)

The wireless LAN node 20 is an access point or a station of the wireless LAN. For example, the wireless LAN node 20 operates according to any one of IEEE 802.11 standards (for example, IEEE 802.11a, 11b, 11g, 11n, 11ac, 11ad, and the like).

The wireless LAN node 20 performs wireless communication through the channel of the wireless LAN (that is, the shared band). For example, the wireless LAN node 20 performs wireless communication according to the CSMA. More specifically, for example, the wireless LAN node 20 performs the carrier sense for the channel. Further, when the result of the carrier sense indicates that the channel is usable (for example, when the result of the carrier sense indicates that no signal is transmitted from other nodes through the channel for a predetermined time), the wireless LAN node 20 performs wireless communication through the channel.

<4.3. Configuration of Base Station>

Figure 17:
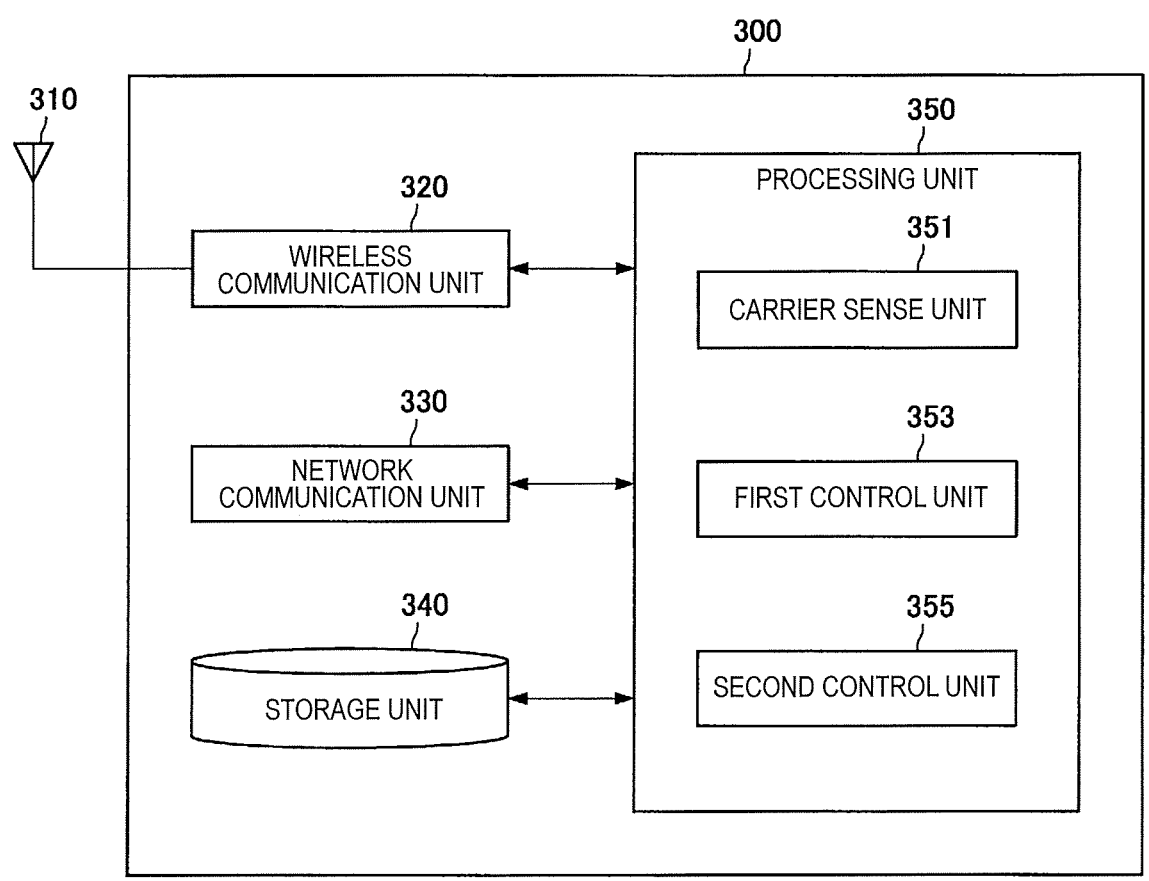
FIG. 17 is a block diagram illustrating an example of a configuration of a base station according to the third embodiment.

Next, an example of a configuration of the base station 300 according to the third embodiment will be described with reference to FIG. 17. FIG. 17 is a block diagram illustrating an example of a configuration of the base station 300 according to the third embodiment. Referring to FIG. 17, the base station 300 includes an antenna unit 310, a wireless communication unit 320, a network communication unit 330, a storage unit 340 and a processing unit 350.

(Antenna Unit 310)

The antenna unit 310 emits a signal output by the wireless communication unit 320 into space as radio waves. The antenna unit 310 converts the radio waves from space into a signal, and outputs the signal to the wireless communication unit 320.

(Wireless Communication Unit 320)

The wireless communication unit 320 performs transmission and reception of a signal. For example, the wireless communication unit 320 performs transmission and reception of a signal using the frequency band for the cellular system and/or the frequency band shared by the cellular system and the wireless LAN (that is, the shared band).

(Network Communication Unit 330)

The network communication unit 330 performs transmission and reception of information. For example, the network communication unit 330 transmits information to another node, and receives information from another node. Examples of another node include another base station and a core network node.

(Storage Unit 340)

The storage unit 340 temporarily or permanently stores programs and data for the operation of the base station 300.

(Processing unit 350)

The processing unit 350 provides various functions of the base station 300. The processing unit 350 includes a carrier sense unit 351, a first control unit 353, and a second control unit 355. The processing unit 350 may further include any component other than these components. In other words, the processing unit 350 can perform an operation other than operations of these components.

(Carrier Sense Unit 351)

The carrier sense unit 351 performs the carrier sense. For example, the carrier sense unit 351 performs the carrier sense for the frequency band shared by the cellular system and the wireless LAN (that is, the shared band). In other words, the carrier sense unit 351 checks whether or not a signal is transmitted from other nodes using the shared band.

(First Control Unit 353)

The first control unit 353 gives a notification to another node. For example, another node includes another base station. For example, the first control unit 353 gives a notification to another node by transmitting information (for example, a message) to another node through the network communication unit 330.

(Second Control Unit 355)

The second control unit 355 controls wireless communication of the base station 300. For example, the second control unit 355 controls wireless communication of the base station 300 in the frequency band shared by the cellular system and the wireless LAN (that is, the shared band). Further, for example, the second control unit 355 controls wireless communication of the base station 300 in the frequency band for the cellular system.

<4.4. Configuration of Base Station>

Figure 18:
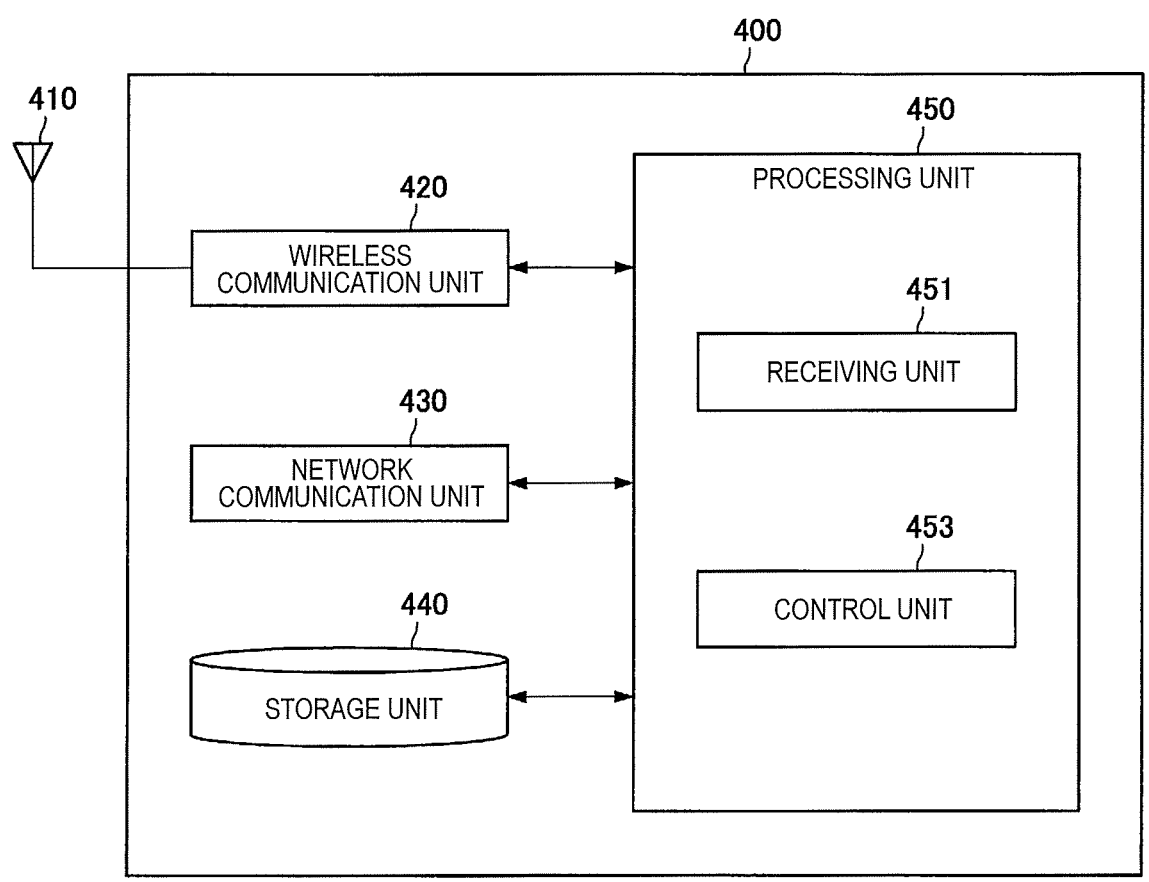
FIG. 18 is a block diagram illustrating an example of a configuration of a base station according to the third embodiment.

Next, an example of a configuration of the base station 400 according to the third embodiment will be described with reference to FIG. 18. FIG. 18 is a block diagram illustrating an example of a configuration of the base station 400 according to the third embodiment. Referring to FIG. 18, the base station 400 includes an antenna unit 410, a wireless communication unit 420, a network communication unit 430, a storage unit 440, and a processing unit 450.

(Antenna Unit 410)

The antenna unit 410 emits a signal output by the wireless communication unit 420 into space as radio waves. The antenna unit 410 converts the radio waves from space into a signal, and outputs the signal to the wireless communication unit 420.

(Wireless Communication Unit 420)

The wireless communication unit 420 performs transmission and reception of a signal. For example, the wireless communication unit 420 performs transmission and reception of a signal using the frequency band for the cellular system and/or the frequency band shared by the cellular system and the wireless LAN (that is, the shared band).

(Network Communication Unit 430)

The network communication unit 430 performs transmission and reception of information. For example, the network communication unit 430 transmits information to another node, and receives information from another node. Examples of another node include another base station and a core network node.

(Storage Unit 440)

The storage unit 440 temporarily or permanently stores programs and data for the operation of the base station 400.

(Processing Unit 450)

The processing unit 450 provides various functions of the base station 400. The processing unit 450 includes a receiving unit 451 and a control unit 453. The processing unit 450 may further include any component other than these components. In other words, the processing unit 450 can perform an operation other than operations of these components.

(Receiving Unit 451)

The receiving unit 451 receives a notification given from another node. Another node includes another base station. For example, the receiving unit 451 receives a notification given from another node by acquiring information (for example, a message) transmitted from another node through the network communication unit 430.

(Control Unit 453)

The control unit 453 controls wireless communication of the base station 400. For example, the control unit 453 controls wireless communication of the base station 400 in a manner that the base station 400 performs wireless communication using the frequency band for the cellular system or the shared band. For example, the control unit 453 starts or ends wireless communication of the base station 400 in the shared band.

<4.5. Technical Characteristics of Third Embodiment>

Figure 19:
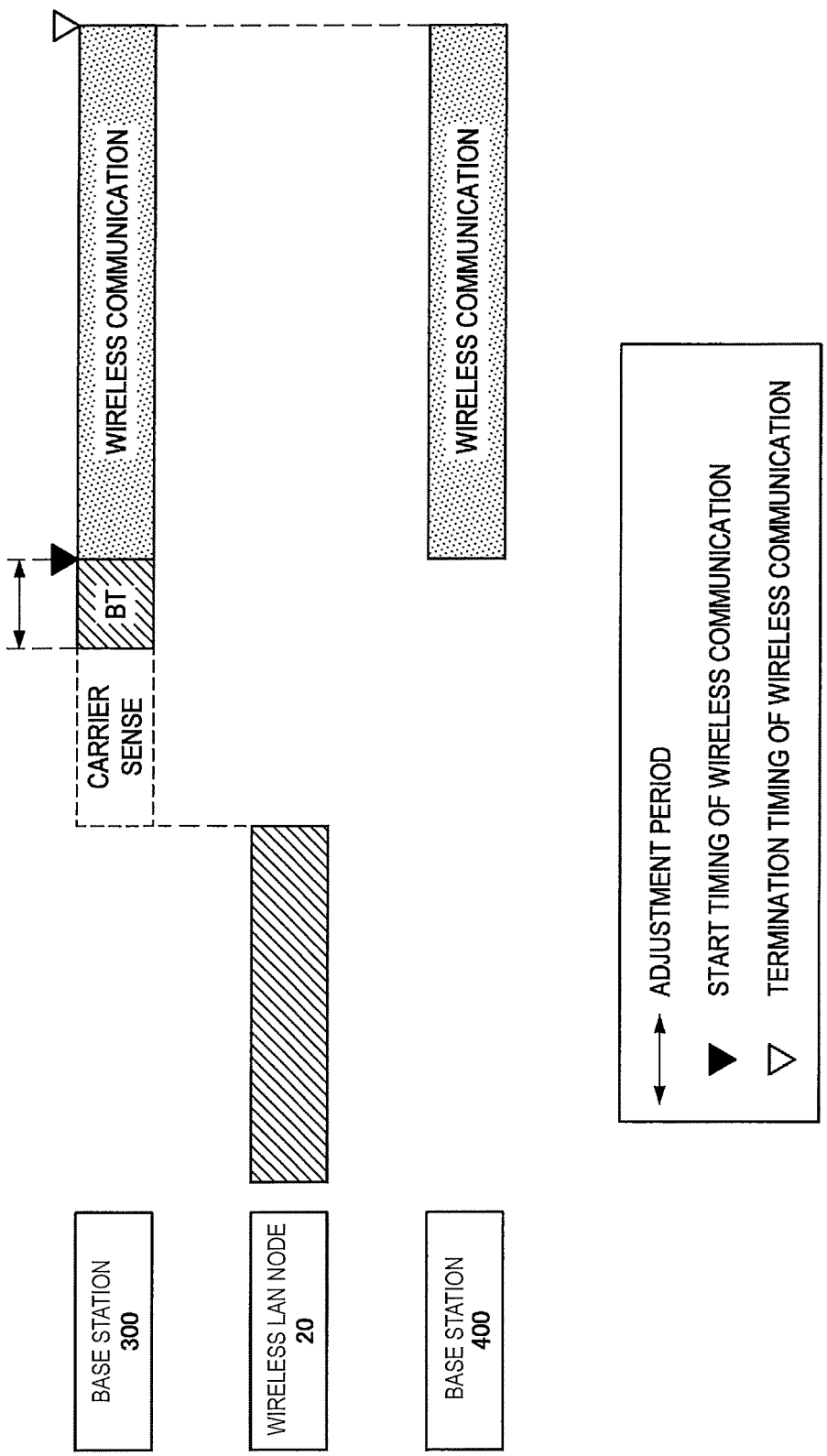
FIG. 19 is an explanatory diagram for describing an example of an operation of a base station according to the third embodiment.

Next, technical characteristics of the third embodiment will be described with reference to FIG. 19.

(Carrier Sense and Notification)

(a) Carrier Sense for Shared Band

The base station 300 (the carrier sense unit 351) performs the carrier sense for the shared band (that is, the frequency band shared by the cellular system and the wireless LAN). In other words, the base station 300 (the carrier sense unit 351) checks whether or not a signal is transmitted from other nodes using the shared band.

(b) Notification

Further, when the result of the carrier sense indicates that the shared band is usable (for example, when the result of the carrier sense indicates that no signal is transmitted from other nodes through the channel for a predetermined time), the base station 300 (the first control unit 353) gives a notification to one or more base stations 400. As an example, the base station 300 gives the notification through transmission of information (a message).

Accordingly, for example, the frequency band shared by the cellular system and the wireless LAN (that is, the shared band) can be more flexibly used in the cellular system. More specifically, for example, one or more base stations 400 may not perform the carrier sense since it is desirable that the wireless communication using the shared band be performed according to the notification given by the base station 300 serving as the representative base station. For this reason, a situation in which the base station 400 detects a signal transmitted from another base station (the base station 300 or the base station 400) in the carrier sense for the shared band and becomes unable to use the shared band does not occur. In other words, competition between the base stations in the shared band can be prevented. Thus, the shared band can be more flexibly used in the cellular system (for example, through interference control or the like).

(b-1) Notification of Start Timing

For example, the notification includes a notification of a start timing of the wireless communication using the shared band. In other words, when the result of the carrier sense indicates that the shared band is usable, the base station 300 (the first control unit 353) gives a notification indicating the start timing of the wireless communication using the shared band to one or more base stations 400.

As an example, the base station 300 (the first control unit 353) performs the notification indicating the start timing through transmission of information (for example, a message) indicating a time of the start timing. As another example, the base station 300 (the first control unit 353) may perform the notification indicating the start timing through transmission of information indicating an adjustment time up to the start timing. The third embodiment is not limited to this example, and the base station 300 (the first control unit 353) may perform the notification indicating the start timing through transmission of any other information specifying the start timing.

Accordingly, for example, the wireless communication of the base stations using the shared band can be set to start at the same timing. Thus, for example, interference control between the base stations is easily performed. Further, it is possible to prevent a situation in which a specific wireless LAN node is unable to perform wireless communication for a long time.

(b-2) Notification of Termination Timing

For example, the notification includes a notification indicating the termination timing of the wireless communication using the shared band. In other words, when the result of the carrier sense indicates that the shared band is usable, the base station 300 (the first control unit 353) gives a notification indicating the termination timing of the wireless communication using the shared band to one or more base stations 400.

As an example, the base station 300 (the first control unit 353) gives the notification of the termination timing through transmission of information (for example, a message) indicating a time of the termination timing. As another example, the base station 300 (the first control unit 353) may give the notification of the termination timing through transmission of information indicating a period from the start timing to the termination timing (that is, a period in which the wireless communication using the shared band is performed). The third embodiment is not limited to this example, and the base station 300 (the first control unit 353) may give the notification of the termination timing through transmission of any other information specifying the termination timing.

Accordingly, for example, the wireless communication of the base stations using the shared band can be set to end at the same timing. Thus, for example, it is possible to prevent a situation in which a specific wireless LAN node is unable to perform wireless communication for a long time.

In the second embodiment, individual base stations give the notification indicating the termination timing to other base stations, but in the third embodiment, the representative base station (the base station 300) gives the notification indicating the termination timing to one or more other base stations (the base station 400) collectively. Thus, in the third embodiment, even when there are a plurality of base stations (for example, in the case of the small cell cluster or the like), the process is not complicated.

(Transmission of Busy Tone Using Shared Band)

For example, the base station 300 transmits a busy tone using the shared band until the start timing of the wireless communication using the shared band. The second control unit 355 controls the transmission of the busy tone by the base station 300 using the shared band in a manner that the base station 300 transmits the busy tone using the shared band until the start timing.

As an example, the second control unit 355 maps a busy tone signal to the radio resources of the shared band until the start timing. Accordingly, the base station 300 transmits the busy tone using the shared band until the start timing.

Thus, for example, it is possible to suppress wireless communication of the wireless LAN node in the shared band until the start timing.

(Wireless Communication Using Shared Band)

(a) Base Station 400

When the result of the carrier sense indicates that the shared band is usable, the base station 400 (the receiving unit 451) receives the notification given from the base station 300 to the base station 400. Then, the base station 400 performs wireless communication using the shared band according to the notification. The control unit 453 controls wireless communication of the base station 400 in a manner that the base station 400 performs wireless communication using the shared band according to the notification.

As an example, the receiving unit 451 receives the notification given from another node by acquiring information (for example, a message) transmitted from the base station 300 through the network communication unit 430.

As an example, the control unit 453 controls wireless communication of the base station 400 by performing allocation of the radio resources of the shared band, a transmission process for transmission using the shared band, a reception process for reception using the shared band, and the like.

(a-1) Start Timing

For example, the notification includes a notification indicating the start timing of the wireless communication using the shared band. In this case, the base station 400 starts the wireless communication using the shared band according to the start timing. The control unit 453 starts wireless communication of the base station 400 in the shared band according to the start timing. For example, the control unit 453 starts wireless communication of the base station 400 in the shared band according to the start timing.

As an example, the control unit 453 sets a first timer based on the start timing, and starts the first timer. Then, the control unit 453 starts wireless communication of the base station 400 in the shared band after the first timer expires.

(a-2) Termination Timing

For example, the notification includes a notification indicating the termination timing of the wireless communication using the shared band. In this case, the base station 400 ends the wireless communication using the shared band according to the termination timing. The control unit 453 ends wireless communication of the base station 400 in the shared band according to the termination timing. For example, the control unit 453 ends wireless communication of the base station 400 in the shared band at the termination timing.

As an example, the control unit 453 sets a second timer based on the termination timing, and starts the second timer. Then, the control unit 453 ends wireless communication of the base station 400 in the shared band after the second timer expires.

(b) Base Station 300

For example, when the result of the carrier sense indicates that the shared band is usable, the base station 300 performs wireless communication using the shared band. When the result of the carrier sense indicates that the shared band is usable, the second control unit 355 controls wireless communication of the base station 300 in a manner that the base station 300 performs wireless communication using the shared band.

As an example, the second control unit 355 controls wireless communication of the base station 300 by performing allocation of the radio resources of the shared band, a transmission process for transmission using the shared band, and/or a reception process for reception using the shared band.

(b-1) Start Timing

For example, the base station 300 starts the wireless communication using the shared band according to the start timing. The second control unit 355 starts wireless communication of the base station 300 in the shared band according to the start timing. For example, the second control unit 355 starts wireless communication of the base station 300 in the shared band at the start timing.

As an example, the second control unit 355 sets a first timer based on the start timing, and starts the first timer. Then, the control unit 355 starts wireless communication of the base station 300 in the shared band after the first timer expires.

(b-2) Termination Timing

For example, the base station 300 ends the wireless communication using the shared band according to the termination timing. The second control unit 355 ends wireless communication of the base station 300 in the shared band according to the termination timing. For example, the second control unit 355 ends wireless communication of the base station 300 in the shared band at the termination timing.

As an example, the second control unit 355 sets a second timer based on the termination timing, and starts the second timer. Then, the second control unit 355 ends wireless communication of the base station 300 in the shared band after the second timer expires.

(Specific Example of Operation)

A specific example of operations of the base station 300 and the base station 400 according to the third embodiment will be described with reference to FIG. 19. FIG. 19 is an explanatory diagram for describing an example of operations of the base station 300 and the base station 400 according to the third embodiment. When the transmission of the signal by the wireless LAN node 20 using the shared band ends, the base station 300 performs the carrier sense for the shared band. When the result of the carrier sense indicates that the shared band is usable, the base station 300 gives a notification indicating the start timing of the wireless communication using the shared band and the termination timing of the wireless communication using the shared band to one or more base stations 400. Further, the base station 300 transmits a busy tone (BT) using the shared band until the start timing. Then, the base station 300 and one or more base stations 400 start the wireless communication using the shared band at the start timing. Further, the base station 300 and one or more base stations 400 end the wireless communication using the shared band at the termination timing.

<4.6. Flow of Process>

Next, the flow of a process according to the third embodiment will be described with reference to FIGS. 20 and 21.

(First Process)

Figure 20:
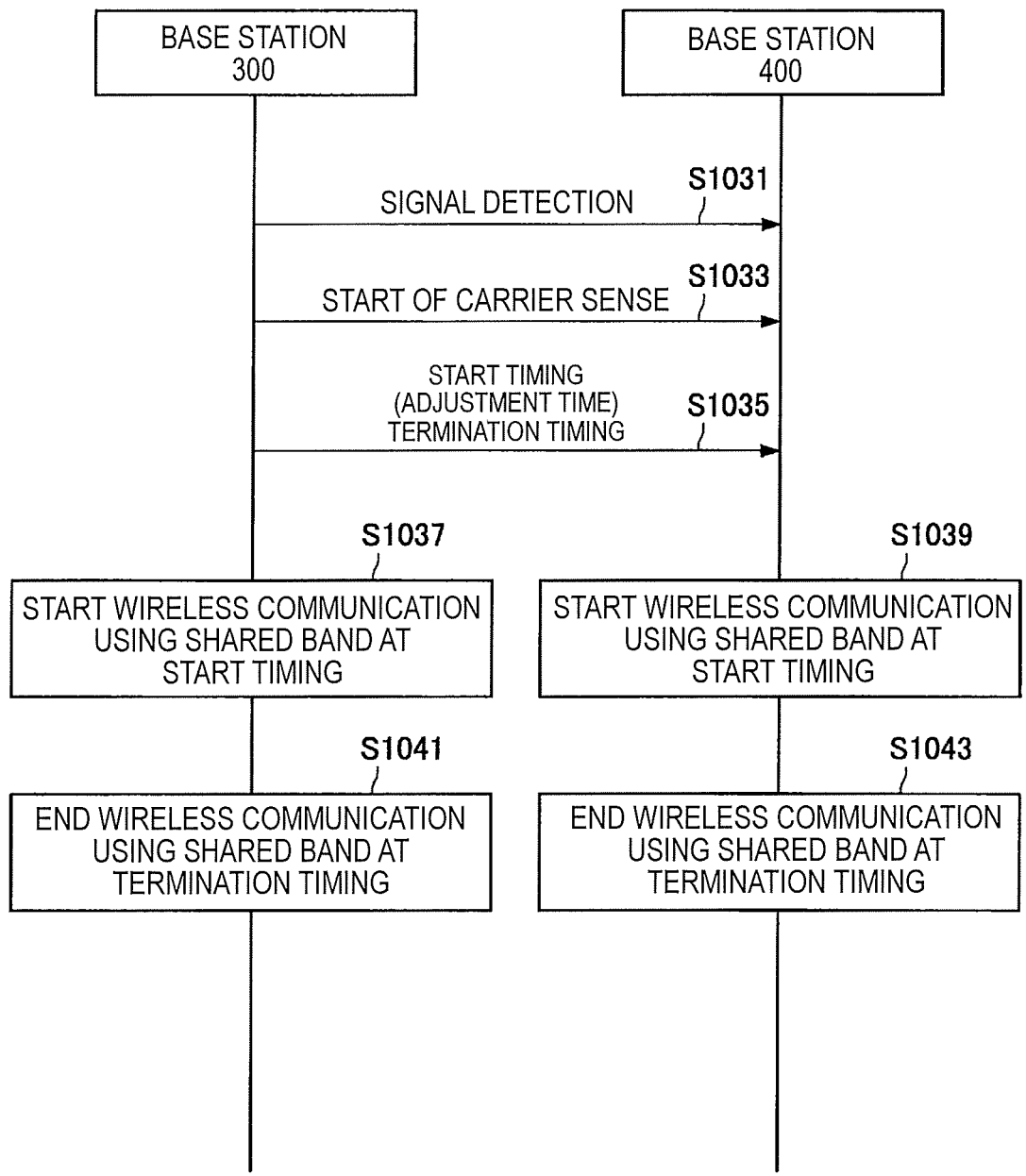
FIG. 20 is a sequence diagram illustrating an example of a schematic flow of a first process according to the third embodiment.

FIG. 20 is a sequence diagram illustrating an example of a schematic flow of a first process according to the third embodiment. The first process is a process related to both of the base station 300 and the base station 400.

The base station 300 gives a notification indicating that a signal is detected in the shared band (the frequency band shared by the cellular system and the wireless LAN) to the base station 400 (S1031).

Then, the base station 300 gives a notification indicating the start of the carrier sense for the shared band to the base station 400 (S1033). In other words, the base station 300 gives a notification indicating that the base station 300 starts the carrier sense to the base station 400.

Thereafter, when the result of the carrier sense indicates that the shared band is usable, the base station 300 gives a notification indicating the start timing of the wireless communication using the shared band and the termination timing of the wireless communication using the shared band to one or more base stations 400 (S1035).

The base station 300 and one or more base stations 400 start the wireless communication using the shared band at the start timing (S1037 and S1039). The base station 300 transmits the busy tone using the shared band until the start timing.

The base station 300 and one or more base stations 400 end the wireless communication using the shared band at the termination timing (S1041, S1043).

(Second Process)

Figure 21:
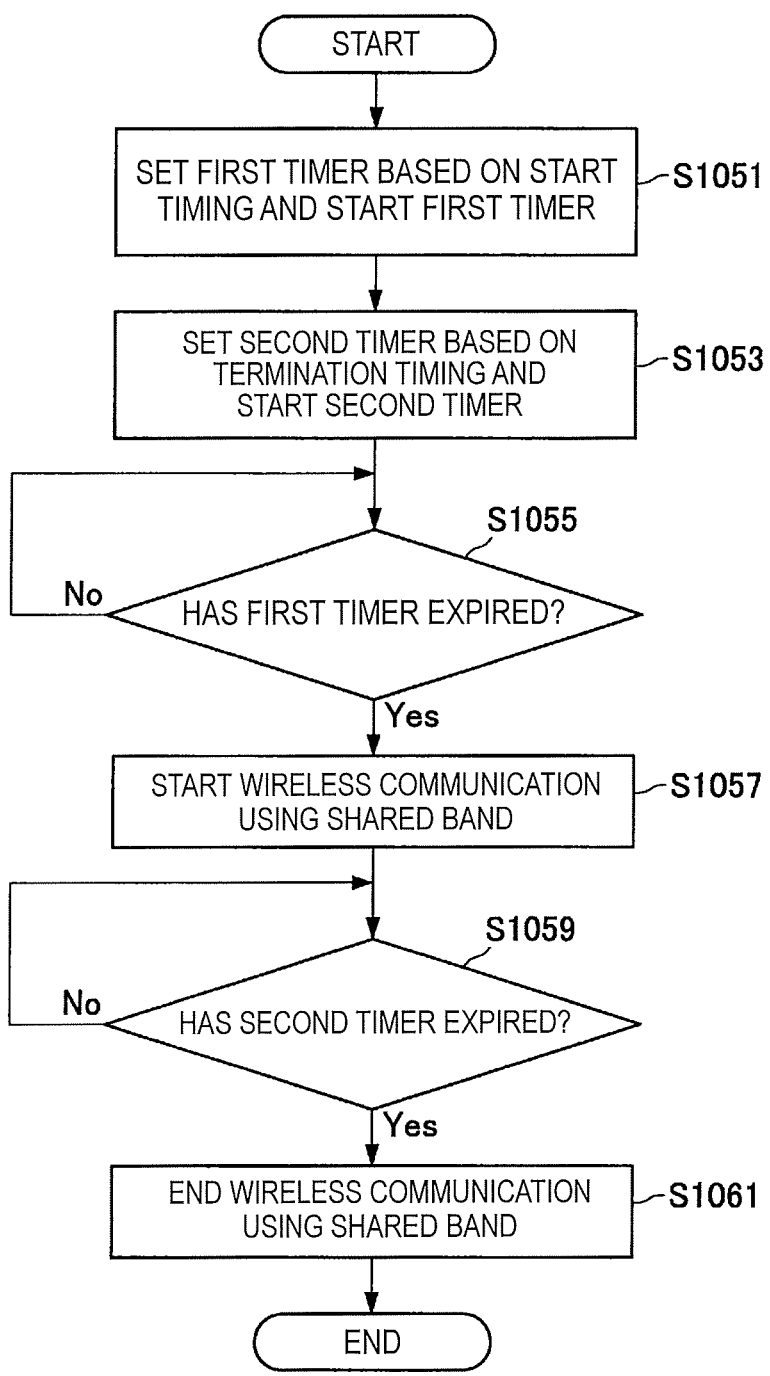
FIG. 21 is a flowchart illustrating an example of a schematic flow of a second process according to the third embodiment.

FIG. 21 is a flowchart illustrating an example of a schematic flow of a second process according to the third embodiment. The second process is a process related to the start or end of the wireless communication using the shared band. Here, an example in which an entity that performs the second process is the base station 400 (the control unit 453) will be described, but the second process may be similarly performed by the base station 300 (the second control unit 355).

The control unit 453 sets the first timer based on the start timing of the wireless communication using the shared band whose notification is given from the base station 300 to the base station 400, and starts the first timer (S1051). Further, the control unit 453 sets the second timer based on the termination timing of the wireless communication using the shared band whose notification is given from the base station 300 to the base station 400, and starts the second timer (S1053).

Thereafter, when the first timer expires (YES in S1055), the base station 400 starts the wireless communication using the shared band (S1057). In other words, the control unit 453 starts the wireless communication of the base station 400 in the shared band.

Further, when the second timer expires (YES in S1059), the base station 400 ends the wireless communication using the shared band (S1061). In other words, the control unit 453 ends the wireless communication of the base station 400 in the shared band. Then, the process ends.

5. Application Example

Technology according to the present disclosure is applicable to various products. For example, the base station (or the base station 100, the base station 200, the base station 300 or the base station 400) may be implemented as a type of eNB such as a macro eNB or a small eNB. The small eNB may be an eNB to cover a cell smaller than a macro cell such as a pico eNB, a micro eNB, or a home (femto) eNB. Conversely, the base stations may also be realized as another type of base station, such as a Node B or a base transceiver station (BTS). The base stations may also include a main unit that controls wireless communication (also called a base station device), and one or more remote radio heads (RRHs) placed in a location separate from the main unit. Also, various types of terminals to be described below temporarily or semi-permanently execute a base station function and therefore may operate as the base stations. Further, at least part of components of the base stations may be implemented in a base station device or a module for the base station device.

First Application Example

Figure 22:
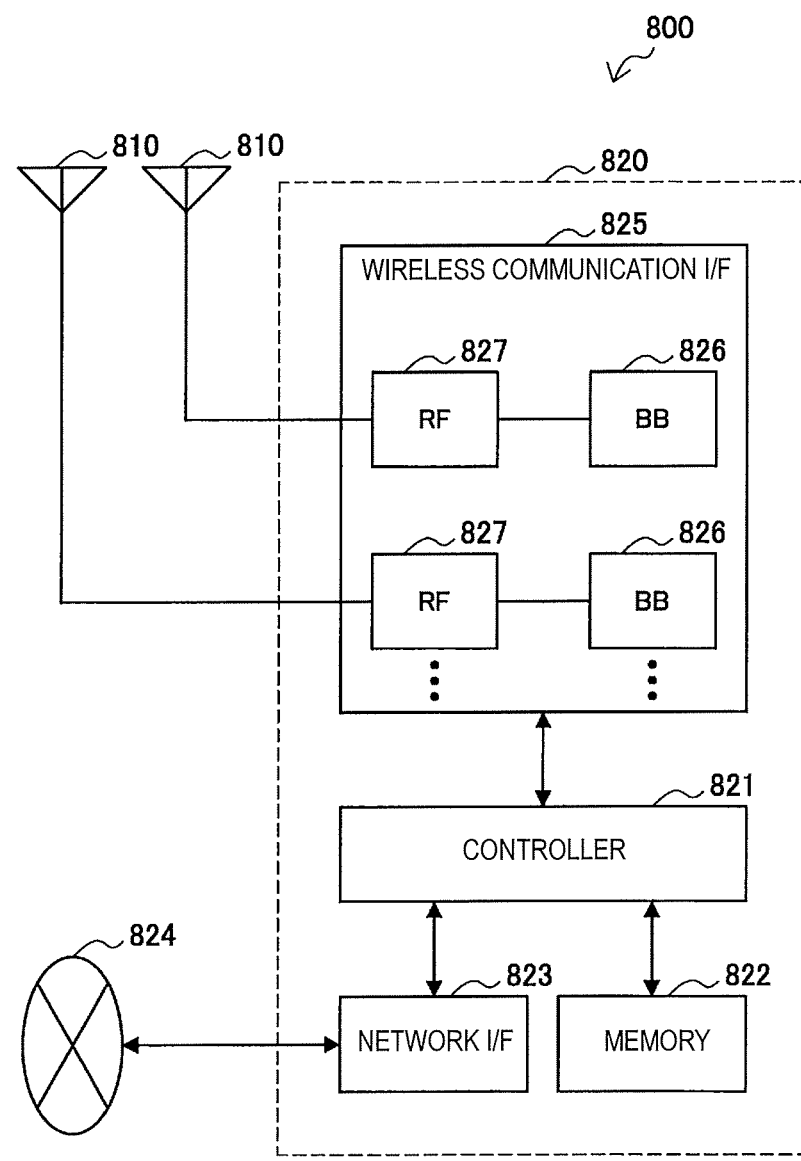
FIG. 22 is a block diagram illustrating a first example of a schematic configuration of an eNB.

FIG. 22 is a block diagram illustrating a first example of a schematic configuration of an eNB to which the technology of the present disclosure may be applied. An eNB 800 includes one or more antennas 810 and a base station device 820. Each antenna 810 and the base station device 820 may be connected to each other via an RF cable.

Each of the antennas 810 includes a single or multiple antenna elements (such as multiple antenna elements included in an MIMO antenna), and is used for the base station device 820 to transmit and receive radio signals. The eNB 800 may include the multiple antennas 810, as illustrated in FIG. 22. For example, the multiple antennas 810 may be compatible with multiple frequency bands used by the eNB 800. Although FIG. 22 illustrates the example in which the eNB 800 includes the multiple antennas 810, the eNB 800 may also include a single antenna 810.

The base station device 820 includes a controller 821, a memory 822, a network interface 823, and a wireless communication interface 825.

The controller 821 may be, for example, a CPU or a DSP, and operates various functions of a higher layer of the base station device 820. For example, the controller 821 generates a data packet from data in signals processed by the wireless communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a wireless communication interface for radio backhaul. If the network interface 823 is a wireless communication interface, the network interface 823 may use a higher frequency band for wireless communication than a frequency band used by the wireless communication interface 825.

The wireless communication interface 825 supports any cellular communication scheme such as LTE and LTE-Advanced, and provides radio connection to a terminal positioned in a cell of the eNB 800 via the antenna 810. The wireless communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-mentioned logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The wireless communication interface 825 may include the multiple BB processors 826, as illustrated in FIG. 22. For example, the multiple BB processors 826 may be compatible with multiple frequency bands used by the eNB 800. The wireless communication interface 825 may include the multiple RF circuits 827, as illustrated in FIG. 22. For example, the multiple RF circuits 827 may be compatible with multiple antenna elements. Although FIG. 22 illustrates the example in which the wireless communication interface 825 includes the multiple BB processors 826 and the multiple RF circuits 827, the wireless communication interface 825 may also include a single BB processor 826 or a single RF circuit 827.

In the eNB 800 illustrated in FIG. 23, one or more components (the carrier sense unit 151, the information acquiring unit 153, the first control unit 155 and/or the second control unit 157) included in the processing unit 150 described with reference to FIG. 7 may be implemented in the wireless communication interface 825. Alternatively, at least a part of such components may be implemented in the controller 821. As one example, the eNB 800 is equipped with a module including a part (for example, the BB processor 826) or all of the wireless communication interface 825 and/or the controller 821, and the one or more components may be implemented in the module. In this case, the above-mentioned module may store a program for causing the processor to function as the one or more components (in other words, a program for causing the processor to execute the operation of the one or more components) and execute the program. As another example, a program for causing the processor to function as the one or more components is installed in the eNB 800, and the wireless communication interface 825 (for example, the BB processor 826) and/or the controller 821 may execute the program. As mentioned above, the eNB 800, the base station device 820, or the above-mentioned module may be provided as the device including the one or more components, and the program for causing the processor to function as the one or more components may be provided. Also, a readable storage medium storing the above-mentioned program may be provided. With respect to these points, the one or more components (the carrier sense unit 251, the information acquiring unit 253, the first control unit 255 and/or the second control unit 257) included in the processing unit 250 described with reference to FIG. 15, the one or more components (the carrier sense unit 351, the first control unit 353 and/or the second control unit 355) included in the processing unit 350 described with reference to FIG. 17, and one or more components (the reception unit 451 and/or the control unit 453) included in the processing unit 450 described above with reference to FIG. 18 are also similar to the one or more components included in the processing unit 150.

Also, in the eNB 800 illustrated in FIG. 22, the wireless communication unit 120 described with reference to FIG. 7 may be implemented in the wireless communication interface 825 (for example, the RF circuit 827). Also, the antenna unit 110 may be implemented in the antenna 810. Also, the network communication unit 130 may be implemented in the controller 821 and/or the network interface 823. For this point, the antenna unit 210, the wireless communication unit 220, and the network communication unit 230 described above with reference to FIG. 15, the antenna unit 310, the wireless communication unit 320, and the network communication unit 330 described above with reference to FIG. 17, and the antenna unit 410, the wireless communication unit 420, and the network communication unit 430 described above with reference to FIG. 18 are similar to the antenna unit 110, the wireless communication unit 120, and the network communication unit 130.

Second Application Example

Figure 23:
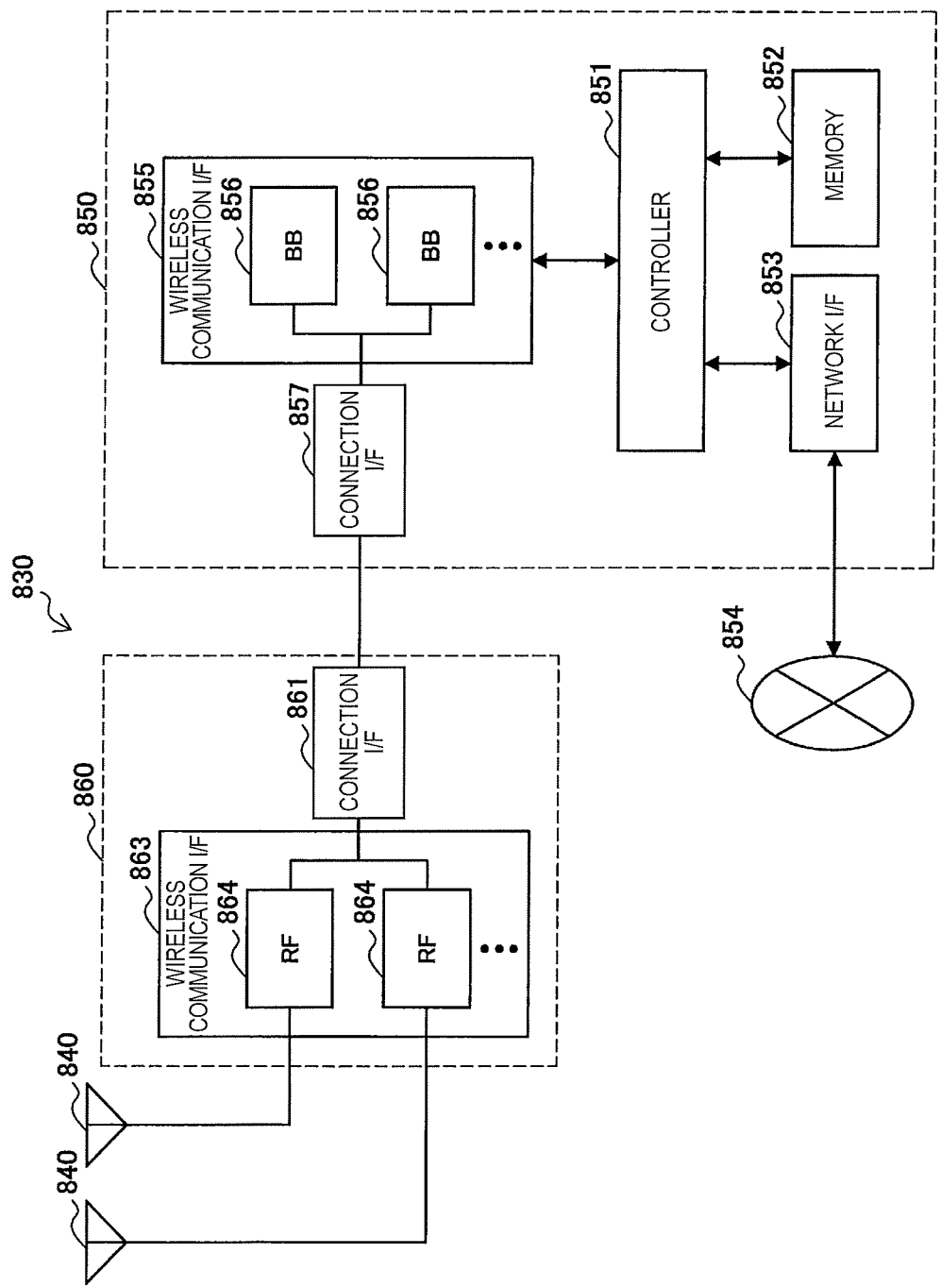
FIG. 23 is a block diagram illustrating a second example of a schematic configuration of an eNB.

FIG. 23 is a block diagram illustrating a second example of a schematic configuration of an eNB to which the technology of the present disclosure may be applied. An eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 23. For example, the multiple antennas 840 may be compatible with multiple frequency bands used by the eNB 830. Although FIG. 23 illustrates the example in which the eNB 830 includes the multiple antennas 840, the eNB 830 may also include a single antenna 840.

The base station device 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 22.

The wireless communication interface 855 supports any cellular communication scheme such as LTE and LTE-Advanced, and provides wireless communication to a terminal positioned in a sector corresponding to the RRH 860 via the RRH 860 and the antenna 840. The wireless communication interface 855 may typically include, for example, a BB processor 856. The BB processor 856 is the same as the BB processor 826 described with reference to FIG. 22, except the BB processor 856 is connected to the RF circuit 864 of the RRH 860 via the connection interface 857. The wireless communication interface 855 may include the multiple BB processors 856, as illustrated in FIG. 23. For example, the multiple BB processors 856 may be compatible with multiple frequency bands used by the eNB 830. Although FIG. 23 illustrates the example in which the wireless communication interface 855 includes the multiple BB processors 856, the wireless communication interface 855 may also include a single BB processor 856.

Furthermore, in addition to a cellular communication scheme, the wireless communication interface 855 may support a radio LAN communication scheme. In that case, the wireless communication interface 825 may include the BB processor 856 in the radio LAN communication scheme.

The RRH 860 includes a connection interface 861 and a wireless communication interface 863.

The connection interface 861 is an interface for connecting the RRH 860 (wireless communication interface 863) to the base station device 850. The connection interface 861 may also be a communication module for communication in the above-mentioned high speed line.

The wireless communication interface 863 transmits and receives radio signals via the antenna 840. The wireless communication interface 863 may typically include, for example, the RF circuit 864. The RF circuit 864 may include, for example, a mixer, a filter, and an amplifier, and transmits and receives radio signals via the antenna 840. The wireless communication interface 863 may include multiple RF circuits 864, as illustrated in FIG. 23. For example, the multiple RF circuits 864 may support multiple antenna elements. Although FIG. 23 illustrates the example in which the wireless communication interface 863 includes the multiple RF circuits 864, the wireless communication interface 863 may also include a single RF circuit 864.

In the eNB 830 illustrated in FIG. 23, one or more components (the carrier sense unit 151, the information acquiring unit 153, the first control unit 155 and/or the second control unit 157) included in the processing unit 150 described with reference to FIG. 7 may be implemented in the wireless communication interface 855 and/or the wireless communication interface 863. Alternatively, at least a part of such components may be implemented in the controller 851. As one example, the eNB 830 is equipped with a module including a part (for example, the BB processor 856) or all of the wireless communication interface 855 and/or the controller 851, and the one or more components may be implemented in the module. In this case, the above-mentioned module may store a program for causing the processor to function as the one or more components (in other words, a program for causing the processor to execute the operation of the one or more components) and execute the program. As another example, a program for causing the processor to function as the one or more components is installed in the eNB 830, and the wireless communication interface 855 (for example, the BB processor 856) and/or the controller 851 may execute the program. As mentioned above, the eNB 830, the base station device 850, or the above-mentioned module may be provided as the device including the one or more components, and the program for causing the processor to function as the one or more components may be provided. Also, a readable storage medium storing the above-mentioned program may be provided. With respect to these points, the one or more components (the carrier sense unit 251, the information acquiring unit 253, the first control unit 255 and/or the second control unit 257) included in the processing unit 250 described with reference to FIG. 15, the one or more components (the carrier sense unit 351, the first control unit 353 and/or the second control unit 355) included in the processing unit 350 described with reference to FIG. 17, and one or more components (the reception unit 451 and/or the control unit 453) included in the processing unit 450 described above with reference to FIG. 18 are also similar to the one or more components included in the processing unit 150.

Also, in the eNB 830 illustrated in FIG. 23, the wireless communication unit 120 described, for example, with reference to FIG. 7 may be implemented in the wireless communication interface 863 (for example, the RF circuit 864). Also, the antenna unit 110 may be implemented in the antenna 840. Also, the network communication unit 130 may be implemented in the controller 851 and/or the network interface 853. For this point, the antenna unit 210, the wireless communication unit 220, and the network communication unit 230 described above with reference to FIG. 15, the antenna unit 310, the wireless communication unit 320, and the network communication unit 330 described above with reference to FIG. 17, and the antenna unit 410, the wireless communication unit 420 and the network communication unit 430 described above with reference to FIG. 18 are similar to the antenna unit 110, the wireless communication unit 120, and the network communication unit 130.

6. Conclusion

Each of the devices and the processes according to the embodiments of the present disclosure has been described with reference to FIGS. 3 to 23.

First Embodiment

According to the first embodiment, the base station 100 includes the carrier sense unit 151 that performs the carrier sense for predetermined radio resources among the radio resources of the frequency band shared by the cellular system and the wireless LAN and the first control unit 155 that controls the wireless communication of the base station 100 in the frequency band in a manner that no signal is transmitted through the predetermined radio resources among the radio resources of the frequency band, and a signal is transmitted through radio resources other than the predetermined radio resources.

Accordingly, for example, the frequency band shared by the cellular system and the wireless LAN (that is, the shared band) can be more flexibly used in the cellular system.

Second Embodiment

According to the second embodiment, the base station 200 includes the information acquiring unit 253 that acquires information indicating a timing at which the base station 200 ends wireless communication using the frequency band shared by the cellular system and the wireless LAN and the second control unit 257 gives a notification indicating the timing to one or more base stations.

Further, according to the second embodiment, the base station 200 includes the first control unit 255 that controls wireless communication of the base station 200 in the frequency band shared by the cellular system and the wireless LAN and the information acquiring unit 253 that acquires information indicating a timing at which another base station ends the wireless communication using the frequency band. The first control unit 255 ends the wireless communication of the base station 200 in the frequency band according to the timing.

Accordingly, it is possible to prevent a situation in which a specific wireless LAN node is unable to perform wireless communication for a long time.

Third Embodiment

According to the third embodiment, the base station 300 (the representative base station) includes the carrier sense unit 351 that performs the carrier sense for the frequency band shared by the cellular system and the wireless LAN and the first control unit 353 that gives a notification to one or more other base stations corresponding to the base station 300 when the result of the carrier sense indicates that the frequency band is usable.

Further, according to the third embodiment, the base station 400 (the base station corresponding to the representative base station) includes the receiving unit 451 that receives a notification which is given to the base station 400 from the representative base station of the cellular system that performs the carrier sense for the frequency band shared by the cellular system and the wireless LAN when the result of the carrier sense indicates that the frequency band is usable and the control unit 453 that controls wireless communication of the base station 400 in a manner that the base station 400 performs wireless communication using the frequency band according to the notification.

Accordingly, for example, the frequency band shared by the cellular system and the wireless LAN (that is, the shared band) can be more flexibly used in the cellular system.

The preferred embodiment(s) of the present disclosure has/have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Although an example in which the cellular system is a system conforming to LTE, LTE-Advanced, or a compliant communication scheme has been described, the present disclosure is not limited to such an example. For example, the cellular system may be the one conforming to another communication standard.

Also, the processing steps in each process in this specification are not strictly limited to execution in a time series following the sequence described in a flowchart or a sequence diagram. For example, the processing steps in each process may be executed in a sequence that differs from a sequence described herein as a flowchart or a sequence diagram, and furthermore may be executed in parallel.

Further, it is also possible to create a computer program for making a processor (such as, for example, a CPU and a DSP) provided at apparatuses (such as, for example, the base station, the base station device or the module of the base station device) in the present specification function as the above-described apparatuses (in other words, a computer program for making the processor execute operation of the components of the above-described apparatuses). Further, it is also possible to provide a recording medium having the above-described computer program recorded therein. Further, it is also possible to provide an apparatus (such as, for example, a base station, a base station device, and a module for the base station device) including a memory having the above-described computer program stored therein and one or more processors which can execute the above-described computer program. Further, a method including the operation of the components (for example, the carrier sense unit, the information acquiring unit, the control unit and/or the second control unit) of the above-described apparatuses is included in the technique according to the present disclosure.

In addition, the advantageous effects described in this specification are merely for the sake of explanation or illustration, and are not limiting. In other words, instead of or in addition to the above advantageous effects, technology according to the present disclosure may exhibit other advantageous effects that are clear to persons skilled in the art from the description of this specification.

Additionally, the present technology may also be configured as below.

(1)

A device, including:

a carrier sense unit configured to perform carrier sense for predetermined radio resources among radio resources of a frequency band shared by a cellular system and a wireless local area network (LAN); and a first control unit configured to control wireless communication of a base station of the cellular system in the frequency band in a manner that no signal is transmitted through the predetermined radio resources among the radio resources of the frequency band, and a signal is transmitted through radio resources other than the predetermined radio resources.

(2)

The device according to (1), wherein the predetermined radio resources are radio resources of a partial band which is a part of the frequency band.

(3)

The device according to (2), wherein the partial band is a fixed band that does not vary periodically.

(4)

The device according to (2), wherein the partial band is a band that varies periodically.

(5)

The device according to (4), wherein the partial band is a band that varies periodically according to a predetermined pattern.

(6)

The device according to any one of (2) to (5), wherein the other radio resources include radio resources of another partial band which is a part of the frequency band.

(7)

The device according to any one of (2) to (6), wherein the predetermined radio resources are radio resources of two or more partial bands which are parts of the frequency band.

(8)

The device according to any one of (1) to (7), wherein the first control unit controls the wireless communication of the base station in the frequency band according to a result of the carrier sense.

(9)

The device according to any one of (1) to (8), further including:

a second control unit configured to give a notification indicating a timing at which the base station ends the wireless communication using the frequency band to one or more other base stations.

(10)

The device according to (9), wherein each of the one or more other base stations is a base station near the base station.

(11)

The device according to (9) or (10), wherein the one or more other base stations include a base station of another cellular system different from the cellular system.

(12)

The device according to (11), wherein the cellular system is a system of a first operator, and the other cellular system is a system of a second operator different from the first operator.

(13)

The device according to any one of (1) to (12), wherein the first control unit ends the wireless communication of the base station in the frequency band according to a timing at which another base station ends the wireless communication using the frequency band.

(14)

The device according to any one of (1) to (13), wherein the frequency band is a channel of the wireless LAN.

(15)

The device according to any one of (1) to (14), wherein the device is the base station, a base station device for the base station, or a module for the base station device.

(16)

A method, including:

performing, by a processor, carrier sense for predetermined radio resources among radio resources of a frequency band shared by a cellular system and a wireless local area network (LAN); and controlling, by the processor, wireless communication of a base station of the cellular system in the frequency band in a manner that no signal is transmitted through the predetermined radio resources among the radio resources of the frequency band, and a signal is transmitted through radio resources other than the predetermined radio resources.

(17)

A program for causing a processor to:

perform carrier sense for predetermined radio resources among radio resources of a frequency band shared by a cellular system and a wireless local area network (LAN); and control wireless communication of a base station of the cellular system in the frequency band in a manner that no signal is transmitted through the predetermined radio resources among the radio resources of the frequency band, and a signal is transmitted through radio resources other than the predetermined radio resources.

(18)

A readable recording medium having a program recorded thereon, the program causing a processor to:

perform carrier sense for predetermined radio resources among radio resources of a frequency band shared by a cellular system and a wireless local area network (LAN); and control wireless communication of a base station of the cellular system in the frequency band in a manner that no signal is transmitted through the predetermined radio resources among the radio resources of the frequency band, and a signal is transmitted through radio resources other than the predetermined radio resources.

(19)

A device, including:

an acquiring unit configured to acquire information indicating a timing at which a base station of a cellular system ends wireless communication using a frequency band shared by the cellular system and a wireless LAN; and a control unit configured to give a notification indicating the timing to one or more other base stations.

(20)

The device according to (19), wherein each of the one or more other base stations is a base station near the base station.

(21)

The device according to (19) or (20), wherein the one or more other base stations include a base station of another cellular system different from the cellular system.

(22)

The device according to (21), wherein the cellular system is a system of a first operator, and the other cellular system is a system of a second operator different from the first operator.

(23)

The device according to any one of (19) to (22), wherein the device is the base station, a base station device for the base station, or a module for the base station device.

(24)

A device, including:

a control unit configured to control wireless communication of a base station of a cellular system in a frequency band shared by the cellular system and a wireless LAN; and an acquiring unit configured to acquire information indicating a timing at which another base station ends the wireless communication using the frequency band, wherein the control unit ends the wireless communication of the base station in the frequency band according to the timing.

(25)

A method, including:

acquiring, by a processor, information indicating a timing at which a base station of a cellular system ends wireless communication using a frequency band shared by the cellular system and a wireless LAN; and giving, by the processor, a notification indicating the timing to one or more other base stations.

(26)

A program for causing a processor to:

acquire information indicating a timing at which a base station of a cellular system ends wireless communication using a frequency band shared by the cellular system and a wireless LAN; and give a notification indicating the timing to one or more other base stations.

(27)

A readable recording medium having a program recorded thereon, the program causing a processor to:

acquire information indicating a timing at which a base station of a cellular system ends wireless communication using a frequency band shared by the cellular system and a wireless LAN; and give a notification indicating the timing to one or more other base stations.

(28)

A method, including:

controlling, by a processor, wireless communication of a base station of a cellular system in a frequency band shared by the cellular system and a wireless LAN; and acquiring, by the processor, information indicating a timing at which another base station ends the wireless communication using the frequency band, wherein the controlling of the wireless communication of the base station in the frequency band includes ending the wireless communication of the base station in the frequency band according to the timing.

(29)

A program for causing a processor to:

control wireless communication of a base station of a cellular system in a frequency band shared by the cellular system and a wireless LAN; and acquire information indicating a timing at which another base station ends the wireless communication using the frequency band, wherein the controlling of the wireless communication of the base station in the frequency band includes ending the wireless communication of the base station in the frequency band according to the timing.

(30)

A readable recording medium having a program recorded thereon, the program causing a processor to:

control wireless communication of a base station of a cellular system in a frequency band shared by the cellular system and a wireless LAN; and acquire information indicating a timing at which another base station ends the wireless communication using the frequency band, wherein the controlling of the wireless communication of the base station in the frequency band includes ending the wireless communication of the base station in the frequency band according to the timing.

(31)

A device, including:

a carrier sense unit configured to perform carrier sense for a frequency band shared by a cellular system and a wireless LAN; and a first control unit configured to give a notification to one or more other base stations corresponding to a representative base station of the cellular system when the result of the carrier sense indicates that the frequency band is usable.

(32)

The device according to (31), wherein the notification includes a notification indicating a start timing of the wireless communication using the frequency band.

(33)

The device according to (32), wherein the first control unit gives the notification indicating the start timing through transmission of information indicating an adjustment time up to the start timing.

(34)

The device according to (32) or (33), further including:

a second control unit configured to control wireless communication of the representative base station, wherein the second control unit starts the wireless communication of the representative base station in the frequency band according to the start timing.

(35)

The device according to any one of (31) to (34), further including:

a second control unit configured to control transmission of a busy tone using the frequency band by the representative base station in a manner that a busy tone is transmitted using the frequency band until the start timing of the wireless communication using the frequency band.

(36)

The device according to any one of (31) to (35), wherein the notification includes a notification indicating a termination timing of the wireless communication using the frequency band.

(37)

The device according to (36), further including:

a second control unit configured to control wireless communication of the representative base station, wherein the second control unit ends the wireless communication of the representative base station in the frequency band according to the termination timing.

(38)

The device according to any one of (31) to (37), wherein the representative base station is a base station which is a cluster head of a small cell cluster, and each of the one or more other base stations is another base station that constitutes the small cell cluster.

(39)

The device according to any one of (31) to (37), wherein the representative base station is a base station of a macro cell, and each of the one or more other base stations is a base station of a small cell overlapping the macro cell.

(40)

The device according to any one of (31) to (39), wherein the device is the representative base station, a base station device for the representative base station, or a module for the base station device.

(41)

A device, including:

a receiving unit configured to receive a notification which is given to a base station corresponding to a representative base station of a cellular system from the representative base station of the cellular system that performs carrier sense for a frequency band shared by the cellular system and a wireless LAN when the result of the carrier sense indicates that the frequency band is usable; and a control unit configured to control wireless communication of the base station according to the notification in a manner that the base station performs wireless communication using the frequency band.

(42)

The device according to (41), wherein the notification includes a notification indicating a start timing of the wireless communication using the frequency band, and the control unit starts the wireless communication of the base station in the frequency band according to the start timing.

(43)

The device according to (41) or (42), wherein the notification includes a notification indicating a termination timing of the wireless communication using the frequency band, and the control unit ends the wireless communication of the base station in the frequency band according to the termination timing.

(44)

The device according to any one of (41) to (43), wherein the device is the base station, a base station device for the base station, or a module for the base station device.

(45)

A method, including:

performing, by a processor, carrier sense for a frequency band shared by a cellular system and a wireless LAN; and giving, by the processor, a notification to one or more other base stations corresponding to a representative base station of the cellular system when the result of the carrier sense indicates that the frequency band is usable.

(46)

A program for causing a processor to:

perform carrier sense for a frequency band shared by a cellular system and a wireless LAN; and give a notification to one or more other base stations corresponding to a representative base station of the cellular system when the result of the carrier sense indicates that the frequency band is usable.

(47)

A readable recording medium having a program recorded thereon, the program causing a processor to:

perform carrier sense for a frequency band shared by a cellular system and a wireless LAN; and give a notification to one or more other base stations corresponding to a representative base station of the cellular system when the result of the carrier sense indicates that the frequency band is usable.

(48)

A method, including:

receiving, by a processor, a notification which is given to a base station corresponding to a representative base station of a cellular system from the representative base station of the cellular system that performs carrier sense for a frequency band shared by the cellular system and a wireless LAN when the result of the carrier sense indicates that the frequency band is usable; and controlling, by the processor, wireless communication of the base station according to the notification in a manner that the base station performs wireless communication using the frequency band.

(49)

A program for causing a processor to:

receive a notification which is given to a base station corresponding to a representative base station of a cellular system from the representative base station of the cellular system that performs carrier sense for a frequency band shared by the cellular system and a wireless LAN when the result of the carrier sense indicates that the frequency band is usable; and control wireless communication of the base station according to the notification in a manner that the base station performs wireless communication using the frequency band.

(50)

A readable recording medium having a program recorded thereon, the program causing a processor to:

receive a notification which is given to a base station corresponding to a representative base station of a cellular system from the representative base station of the cellular system that performs carrier sense for a frequency band shared by the cellular system and a wireless LAN when the result of the carrier sense indicates that the frequency band is usable; and control wireless communication of the base station according to the notification in a manner that the base station performs wireless communication using the frequency band.

REFERENCE SIGNS LIST 1, 2, 3 communication system
10 base station
20 wireless LAN node
30 shared band
31, 32, 33, 34, 35, 36 partial band
41, 42, 43, 44 sub frame
100, 200, 300, 400 base station
151, 251, 351 carrier sense unit
153, 253 information acquiring unit
155, 255, 353 first control unit
157, 257, 355 second control unit
451 receiving unit
453 control unit

The invention claimed is:

1. A device, comprising:
   circuitry including at least a processor and a memory, the circuitry configured to
   perform carrier sense for predetermined radio resources among radio resources of a frequency band that is shared by a first cellular system and a wireless local area network (LAN);
   control a first base station of the first cellular system in the frequency band so that no signal is transmitted through the predetermined radio resources after an identified frame or sub-frame;
   provide a notification, to a second base station, indicating the radio frame or sub-frame after which the first base station is to end wireless communication in the frequency band; and
   end wireless communication of the second base station in the frequency band at a timing at which the first base station ends the wireless communication using the frequency band.

2. The device according to claim 1, wherein the predetermined radio resources are radio resources of a partial band, which is a fixed band that does not vary periodically.

3. The device according to claim 1, wherein the predetermined radio resources are radio resources of a partial band, which is a band that varies periodically.

4. The device according to claim 3, wherein the partial band is a band that varies periodically according to a predetermined pattern.

5. The device according to claim 1, wherein the predetermined radio resources are radio resources of two or more partial bands which are parts of the frequency band.

6. The device according to claim 1, wherein the circuitry is further configured to control wireless communication of the first base station in the frequency band according to a result of the carrier sense.

7. The device according to claim 1, wherein the second base station is located near the first base station.

8. The device according to claim 1, wherein the second base station is included in a second cellular system different from the first cellular system.

9. The device according to claim 8, wherein
the first cellular system is a system of a first operator, and the second cellular system is a system of a second operator different from the first operator.

10. The device according to claim 1, wherein the circuitry is further configured to end wireless communication of the first base station in the frequency band according to a timing at which the second base station ends the wireless communication using the frequency band.

11. The device according to claim 1, wherein the frequency band is a channel of the wireless LAN.

12. The device according to claim 1, wherein the device is the first base station, a base station device for the first base station, or a circuit for the base station device.

13. The device according to claim 1, wherein the predetermined radio resources are radio resources of a partial band which is a part of the frequency band.

14. The device according to claim 13, wherein the radio resources include other radio resources of another partial band which is a part of the frequency band.

15. The device according to claim 1, wherein the wireless communication of the second base station in the frequency band is set to end at the radio frame or sub-frame indicated in the notification.

16. The device according to claim 1, wherein the circuitry is further configured to receive an acknowledgement, from the second base station, of the transmitted notification.

17. The device according to claim 1, wherein the circuitry is further configured to provide a start notification, to the second base station, that indicates a start timing of the wireless communication.

18. A method, comprising:
performing, by circuitry, carrier sense for predetermined radio resources among radio resources of a frequency band shared that is by a cellular system and a wireless local area network (LAN);
controlling, by the circuitry, a first base station of the cellular system in the frequency band so that no signal is transmitted through the predetermined radio resources and after an identified frame or sub-frame;
providing a notification, to a second base station, indicating the radio frame or sub-frame after which the second base station is to end wireless communication in the frequency band; and
ending wireless communication of the second base station in the frequency band at a timing at which the first base station ends the wireless communication using the frequency band.

19. The method according to claim 18, wherein the predetermined radio resources are radio resources of a partial band which is a part of the frequency band.

20. The method according to claim 19, wherein the radio resources include other radio resources of another partial band which is a part of the frequency band.

* * * * *